United States Patent
Kang et al.

(10) Patent No.: US 10,045,222 B2
(45) Date of Patent: Aug. 7, 2018

(54) METHOD FOR COMMUNICATING MESSAGE BETWEEN ENTITIES IN COEXISTENCE MANAGEMENT SYSTEM

(71) Applicant: Electronics and Telecommunications Research Institute, Daejeon (KR)

(72) Inventors: Hyun Duk Kang, Gwangju (KR); Gwang Zeen Ko, Daejeon (KR); Myung Sun Song, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 160 days.

(21) Appl. No.: 14/890,883

(22) PCT Filed: May 9, 2014

(86) PCT No.: PCT/KR2014/004182
§ 371 (c)(1),
(2) Date: Nov. 12, 2015

(87) PCT Pub. No.: WO2014/185666
PCT Pub. Date: Nov. 20, 2014

(65) Prior Publication Data
US 2016/0135117 A1 May 12, 2016

(30) Foreign Application Priority Data

May 13, 2013 (KR) .................. 10-2013-0053651
May 7, 2014 (KR) .................. 10-2014-0054264

(51) Int. Cl.
*H04W 16/14* (2009.01)
(52) U.S. Cl.
CPC .................. *H04W 16/14* (2013.01)
(58) Field of Classification Search
CPC .. H04J 11/0023; H04J 11/0026; H04J 11/005; H04W 16/14
See application file for complete search history.

(56) References Cited

U.S. PATENT DOCUMENTS

2012/0115525 A1  5/2012 Kang et al.
2013/0054723 A1* 2/2013 Jo .................. H04W 24/00
709/206

(Continued)

FOREIGN PATENT DOCUMENTS

KR  1020080076262 A  8/2008
KR  1020100041235 A  4/2010

(Continued)

OTHER PUBLICATIONS

"IEEE Standard for Information technology—Telecommunications and information exchange between systems—Local and metropolitan area networks—Specific requirements—Part 19: TV White Space Coexistence Methods," IEEE Std 802.19.1™-2014, May 2, 2014, pp. 1-314, The Institute of Electrical and Electronics Engineers, Inc., New York, USA.

(Continued)

*Primary Examiner* — Andrew W Chriss
*Assistant Examiner* — Kenan Cehic
(74) *Attorney, Agent, or Firm* — William Park & Associates Ltd.

(57) ABSTRACT

Disclosed are methods of exchanging messages necessary for interaction among entities in a coexistence management system that manages a plurality of frequency sharing devices. Specifically, a method of exchanging messages in a coexistence management system including a coexistence enabler (CE), a coexistence manager (CM), and a coexistence discovery and information server (CDIS) includes generating, by the CM, a ReconfigurationRequest message, sending the ReconfigurationRequest message to the CE, and waiting for a ReconfigurationResponse message from the CE. The ReconfigurationRequest message includes at least one of an operating channel list of a white space object (WSO) served by the CE, a transmission power limitation, (Continued)

a flag indicating whether or not a channel is shared, a transmission schedule, and channel classification information.

7 Claims, 10 Drawing Sheets

(56) References Cited

U.S. PATENT DOCUMENTS

| | | | |
|---|---|---|---|
| 2013/0165170 A1 | 6/2013 | Kang | |
| 2013/0295947 A1* | 11/2013 | Lee | H04W 16/14 455/452.1 |
| 2014/0038657 A1* | 2/2014 | Jo | H04W 16/14 455/509 |
| 2014/0135048 A1* | 5/2014 | Kasslin | H04W 24/02 455/501 |
| 2015/0072702 A1* | 3/2015 | Chun | H04W 16/14 455/454 |

FOREIGN PATENT DOCUMENTS

| | | |
|---|---|---|
| KR | 1020120023575 A | 3/2012 |
| KR | 1020120132607 A | 12/2012 |
| WO | 2012030190 A2 | 3/2012 |
| WO | 2013066005 A1 | 5/2013 |

OTHER PUBLICATIONS

Päivi Ruuska et al., "Proposal on coexistence system services and protocols", IEEE P802.19 Wireless Coexistence, Nov. 7, 2010, pp. 1-46.

* cited by examiner

METHOD FOR COMMUNICATING MESSAGE BETWEEN ENTITIES IN COEXISTENCE MANAGEMENT SYSTEM

TECHNICAL FIELD

The present invention relates to a coexistence management technology, and more particularly, to a method of exchanging messages necessary for interaction between entities in a coexistence management system that manages a plurality of frequency sharing devices.

BACKGROUND ART

A coexistence technology is a spectrum management technology that enables wireless devices using different communication protocols at a core frequency (30 MHz to 10 GHz), in which various dynamic spectrum access (DSA) technologies are expected to emerge, to coexist without harmful interference. The DSA technologies, such as underlay and overlay approaches, which are an opposing concept to a current static spectrum management technology, are wireless access and management technologies in which a spectrum is dynamically managed according to radio environments around wireless devices to maximize flexibility and efficiency of frequency use. To prepare for spectrum sharing technologies which variously emerge for respective wireless services, such as the Institute of Electrical and Electronics Engineers (IEEE) 802 Standards Coordinating Committee (SCC) 41, a technology for deriving coexistence standards capable of comprehensively operating a plurality of sharing technologies in terms of spectrum management by countries is under development.

Domestically, research into integrated coexistence conditions of various sharing technologies for securing optimal frequency efficiency among various white space objects (WSOs) under congested radio environments, such as a frequency auction system and sharing of a licensed band and an unlicensed band, has not been systematically conducted. Technical issues about a coexistence scenario between frequency-sharing wireless systems in a licensed band and an unlicensed band, coexistence analysis, a sharing mechanism for coexistence, etc., are being discussed in the wireless coexistence working group that handles a coexistence problem between the 802 standards in the international standardization organization, the IEEE 802.19.

DISCLOSURE

Technical Problem

The present invention is directed to providing inter-entity message delivery methods and message parameters for interference avoidance and efficient resource management in a coexistence management system for managing a plurality of frequency sharing devices.

Technical Solution

One aspect of the present invention provides a method of exchanging messages among a coexistence enabler (CE), a coexistence manager (CM), and a coexistence discovery and information server (CDIS) in a coexistence management system including the CE, the CM, and the CDIS. The method includes: generating, by the CM, a ReconfigurationRequest message and sending the ReconfigurationRequest message to the CE; and waiting for a ReconfigurationResponse message from the CE. The ReconfigurationRequest message includes at least one among a group of an operating channel list of a white space object (WSO) served by the CE, a transmission power limitation, a flag indicating whether or not a channel is shared, a transmission schedule, and channel classification information.

In an exemplary embodiment, the channel classification information may include at least one among a group of an available channel list, a restricted channel list, a protected channel list, an unclassified channel list, an operating channel list, and a coexistence channel list.

In an exemplary embodiment, the method may further include: generating and sending, by the CE having received the ReconfigurationRequest message, a PerformReconfigurationRequest primitive to the WSO served by the CE; receiving, by the CE, a PerformReconfigurationResponse primitive from the WSO; and generating, by the CE, the ReconfigurationResponse message and sending the ReconfigurationResponse message to the CM. The PerformReconfigurationRequest primitive may include at least one among a group of the operating channel list of the WSO served by the CE, the transmission power limitation, the flag indicating whether or not a channel is shared, the transmission schedule, and the channel classification information included in the ReconfigurationRequest message received from the CM.

In an exemplary embodiment, the PerformReconfigurationResponse primitive received from the WSO may include a failure parameter indicating that reconfiguration has failed, and the ReconfigurationResponse message generated by the CE may include the failure parameter received from the WSO through the PerformReconfigurationResponse primitive.

Another aspect of the present invention provides a method of exchanging messages among a CE, a CM, and a CDIS in a coexistence management system including the CE, the CM, and the CDIS. The method includes: generating, by the CM, a DeregistrationRequest message and sending the DeregistrationRequest message to the CE; waiting for a DeregistrationResponse message from the CE; and sending, by the CM, a message to the CDIS for requesting removal of the CE when the DeregistrationResponse message is received.

In an exemplary embodiment, the method may further include: generating, by the CE having received the DeregistrationRequest message, a PerformDeregistrationRequest primitive, sending the PerformDeregistrationRequest primitive to a WSO served by the CE, and waiting for a PerformDeregistrationResponse primitive from the WSO; and generating, by the CE, the DeregistrationResponse message and sending the DeregistrationResponse message to the CM when the PerformDeregistrationResponse primitive is received from the WSO. The PerformDeregistrationResponse primitive may include information indicating a deregistered state of the WSO.

In an exemplary embodiment, the method may further include, before the generating of the DeregistrationRequest message and sending of the DeregistrationRequest message to the CE by the CM: generating, by the CM, a ReconfigurationRequest message, sending the ReconfigurationRequest message to the CE, and then waiting for a ReconfigurationResponse message from the CE, and the DeregistrationRequest message may be sent to the CE when a failure parameter indicating that reconfiguration has failed is included in the ReconfigurationResponse message received from the CE.

In an exemplary embodiment, the CE having received the DeregistrationRequest message may switch from a management service provided by the CM to an information service.

In an exemplary embodiment, the CE having received the DeregistrationRequest message may subscribe to and register for a management service provided by a new CM.

Still another aspect of the present invention provides a method of exchanging messages between a CE and a CM in a coexistence management system including the CE, the CM, and a CDIS. The method includes: receiving, by the CE, an EventIndication primitive including an event parameter list from a WSO served by the CE; generating, by the CE, an EventIndication message including the event parameter list included in the EventIndication primitive and sending the EventIndication message to the CM; and waiting for an EventConfirm message from the CM.

In an exemplary embodiment, the event parameter list may include at least one of a parameter indicating reaching a signal-to-interference-plus-noise ratio (SINR) threshold and a parameter indicating degradation of quality of service (QoS).

Yet another aspect of the present invention provides a method of exchanging messages between a CE and a CM in a coexistence management system including the CE, the CM, and a CDIS. The method includes: receiving, by the CE, a CoexistenceReportRequest primitive from a WSO served by the CE; generating, by the CE, a CoexistenceReportRequest message and sending the CoexistenceReportRequest message to the CM; waiting for a CoexistenceReportResponse message from the CM; and generating, by the CE, a CoexistenceReportResponse primitive and sending the CoexistenceReportResponse primitive to the WSO when a CoexistenceReportResponse message is received from the CM.

In an exemplary embodiment, the CoexistenceReportResponse message may include coexistence set element information, which includes a neighbor network identifier (ID), network technology information of a neighbor WSO, and a neighbor operating channel number, of the WSO and channel priority information.

Yet another aspect of the present invention provides a method of exchanging messages between CMs in a coexistence management system including CEs, the CMs, and a CDIS. The method includes: generating, by a CM intending to be a slave, a MasterCMRequest message and sending the MasterCMRequest message to at least one candidate CM wanted to be a master; and receiving a MasterCMResponse message from the candidate CM. Accordingly, the CM having sent the MasterCMRequest message is set as a slave, and the candidate CM having sent the MasterCMResponse message is set as a master.

In an exemplary embodiment, the MasterCMRequest message may include a list of CEs managed by the CM intending to be a slave.

In an exemplary embodiment, the method may further include: generating, by the CM set as the master, a MasterSlaveCMConfigurationRequest message and sending the MasterSlaveCMConfigurationRequest message to the slave CM; and waiting for a MasterSlaveCMConfigurationResponse message from the slave CM.

In an exemplary embodiment, the MasterSlaveCMConfigurationRequest message may include a list of CEs managed by the master CM.

In an exemplary embodiment, the method may further include generating, by the slave CM, the MasterSlaveCMConfigurationResponse message and sending the MasterSlaveCMConfigurationResponse message to the master CM, and the MasterSlaveCMConfigurationResponse message may include at least one of an operation code, a CE ID, a network ID of a WSO, network technology information of the WSO, a network type, discovery information of the WSO, a flag indicating whether or not scheduled transmission is supported, an available channel list, a supported channel number list, a WSO operating channel list, resource information required for a WSO operation, and measurement capability information of the WSO, with regard to each of CEs to be registered in the slave CM and managed by the master CM.

In an exemplary embodiment, the available channel list may include at least one of an available channel number, an available start time of the available channel number, an available duration of the available channel number, and constraint information of the available channel number.

In an exemplary embodiment, the required resource information may include at least one of a required bandwidth and an expected occupancy.

Advantageous Effects

Procedures for entities (a coexistence enabler (CE), a coexistence manager (CM), and a coexistence discovery and information server (CDIS)) of a coexistence system, that is, message delivery methods and message parameters, proposed in the present invention enable efficient operation of a coexistence management system for interference avoidance and efficient resource management among a plurality of different types of frequency sharing devices that share a common frequency band.

MODES OF THE INVENTION

Since the present invention may be variously modified and have several embodiments, specific embodiments are illustrated in the accompanying drawings and will be described in detail in the descriptions below. However, the present invention is not limited to the specific embodiments and should be construed as including all the changes, equivalents, and substitutions included in the spirit and scope of the present invention.

In describing the present invention, the detailed description of related known technology will be omitted when it may obscure the gist of the present invention.

Singular expressions used herein include plural meanings unless specified otherwise in the context thereof.

Among terms used herein, the terms "module," "unit," "interface," etc., generally denote computer-related objects, for example, hardware, software, or combinations of hardware and software.

Figure 1:
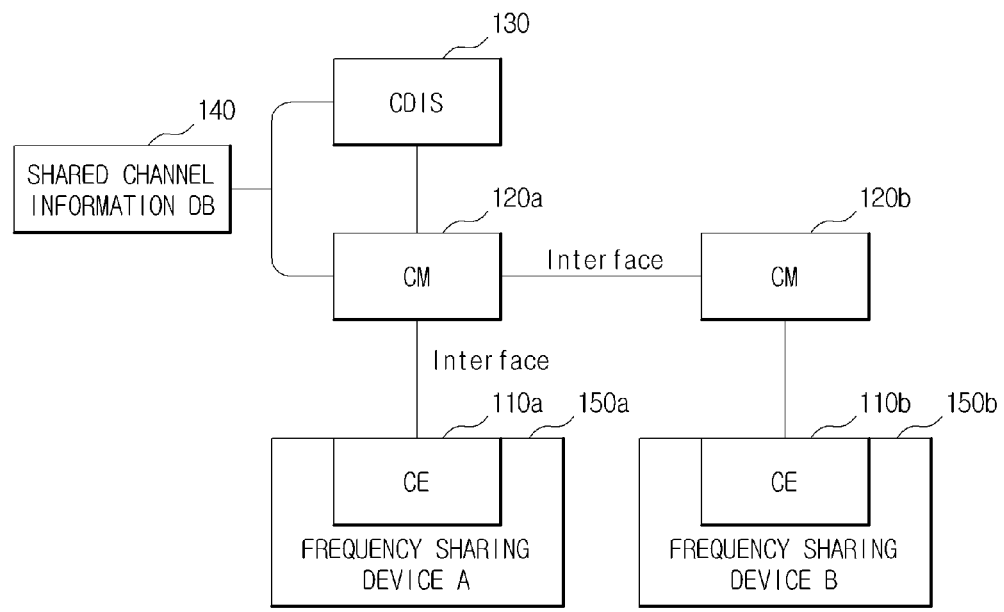
FIG. 1 is a diagram showing a constitution of a coexistence management system.

FIG. 1 is a diagram showing a constitution of a coexistence management system.

As shown in the drawing, a coexistence management system may include three types of entities, that is, coexistence enablers (CEs) 110a and 110b, coexistence managers (CMs) 120a and 120b, and a coexistence discovery and information server (CDIS) 130, and a shared channel information database (DB) 140. For convenience of description, FIG. 1 shows two frequency sharing devices and two CEs and two CMs associated with the frequency sharing devices, but those of ordinary skill in the art would appreciate that the present invention is not limited to a constitution including a specific number of CEs and a specific number of CMs.

The CEs 110a and 110b are entities that are present in frequency sharing devices 150a and 150b and serve as passages between the frequency sharing devices 150a and 150b and the CMs 120a and 120b. The CEs 110a and 110b serve to extract context information (e.g., a wireless access scheme, transmission power, a spectrum sensing threshold value, and a position) associated with the corresponding frequency sharing devices (or the white space objects (WSOs) 150a and 150b) requested by the CMs 120a and 120b from the WSOs 150a and 150b and send the context information to the CMs 120a and 120b. Also, the CEs 110a and 110b serve to send event information (e.g., changes in the context information of the WSOs 150a and 150b) requested by the CMs 120a and 120b, and cause the WSOs 150a and 150b to reflect on resetting of configurations of the WSOs 150a and 150b directed by the CMs 120a and 120b.

The CMs 120a and 120b are entities that make important decisions associated with frequency sharing, such as operating frequency allocation, transmission power allocation, and transmission time allocation, for improving the efficiency of frequency sharing between the plurality of WSOs 150a and 150b. The CMs 120a and 120b may collect channel measurement information, etc., through the WSOs 150a and 150b.

In addition, when there is a need for cooperation with another CM controlling another frequency sharing device, the CMs 120a and 120b may exchange information directly or through the CDIS 130. The CMs 120a and 120b may discover neighbor WSOs of the WSOs 150a and 150b belonging to the CMs 120a and 120b.

The CMs 120a and 120b may acquire information on channels that may be used by the WSOs 150a and 150b from the channel information DB 140.

The CDIS 130 is an entity for assisting in decision making associated with control of the WSOs 150a and 150b. The CDIS 130 acquires necessary information from the plurality of CMs 120a and 120b, stores the acquired information, and sends information required by the CMs 120a and 120b connected thereto. The CDIS 130 may discover a neighbor frequency sharing device of a WSO belonging to each of the CMs 120a and 120b. Also, the CDIS 130 may acquire the information on the channels that may be used by the frequency sharing devices 150a and 150b from the channel information DB 140.

The shared channel information DB 140 provides information on channels that may be used by frequency sharing devices.

Specifically, the CMs 120a and 120b may provide the WSOs 150a and 150b with two types of coexistence services, that is, a management service and an information service. The management service causes the WSOs 150a and 150b to reflect on reconfigurations of the WSOs 150a and 150b directed by the CMs 120a and 120b. The information service delivers information associated with coexistence to the WSOs 150a and 150b through the CEs 110a and 110b, and enables the WSOs 150a and 150b to make important decisions associated with frequency sharing by themselves based on the information.

The CMs 120a and 120b may be operated under three types of topologies, that is, autonomous, centralized, and distributed topologies. In the autonomous topology, information for coexistence is exchanged among a plurality of CMs, but a decision associated with coexistence is made by each CM without a negotiation with another CM or help of a master CM. In the centralized topology, a plurality of slave CMs are connected to one master CM, and the slave CMs are controlled by the master CM to solve the coexistence problem of the WSOs 150a and 150b. On the other hand, in the distributed topology, the coexistence problem of the WSOs 150a and 150b is solved through negotiations between a CM and surrounding CMs. The discovery of a neighbor frequency sharing device (or WSO) that may cause co-channel interference between WSOs is very important for coexistence of WSOs. Such a discovery of a neighbor WSO may be performed by the CMs 120a and 120b and/or the CDIS 130. First, a discovery of a neighbor WSO may be classified into the following two types:

a discovery of neighbor WSOs among WSOs registered in the same CM (Intra-CM WSO neighbors), and
a discovery of neighbor WSOs among WSOs registered in different CMs (Inter-CM WSO neighbors).

The CDIS 130 may provide the CMs 120a and 120b with two types of discovery services according to the following two cases. In a first case, the CDIS 130 provides only an inter-CM discovery service. In this case, the CMs 120a and 120b discover only intra-CM neighbor WSOs, and the CDIS 130 discovers inter-CM neighbor WSOs. In a second case, the CDIS 130 provides both the intra-CM and inter-CM discovery services. In this case, both types of neighbor discovery are performed by the CDIS 130 only.

Meanwhile, neighbor CMs denote a case in which neighbor WSOs are registered in different CMs.

An exemplary embodiment of the present invention proposes messages and procedures for message delivery necessary for interaction among respective entities (a CE, a CM, and a CDIS) of the above-described coexistence system. According to a message received by each entity from another entity, each procedure is used for a specific purpose, and CxMessage parameters of messages exchanged between entities are determined.

With reference to FIGS. 2 to 13, messages and related procedures necessary for interaction among entities according to an exemplary embodiment of the present invention will be described below.

CM Subscription

Figure 2:
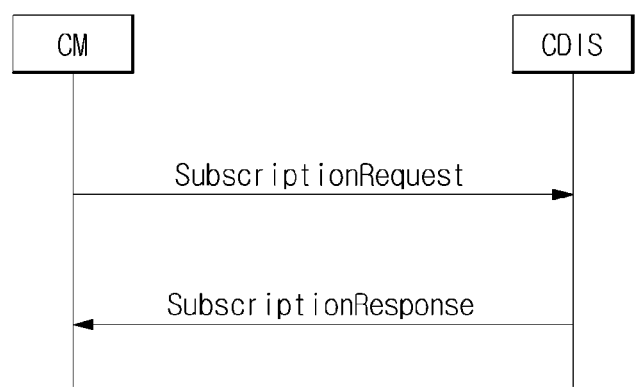
FIG. 2 shows a coexistence manager (CM) subscription procedure according to an exemplary embodiment of the present invention.

FIG. 2 shows a CM subscription procedure according to an exemplary embodiment of the present invention.

To subscribe to a discovery service provided by a CDIS, a CM may perform a CM subscription procedure. As shown in FIG. 2, the CM generates a SubscriptionRequest message, sends the SubscriptionRequest message to the CDIS, and then waits for a SubscriptionResponse message from the CDIS. Table 1 shows CxMessage parameters of in the SubscriptionRequest message.

TABLE 1

| Parameter | Data type | Value |
|---|---|---|
| Header | CxHeader | requestID |
| payload | CxPayload | subscriptionRequest |

Table 2 shows parameters of a subscriptionRequest payload.

TABLE 2

| Parameter | Data type | Description |
|---|---|---|
| subscribedService | SubscribedService | This parameter indicates subscribed service type (interCMCoexistenceSetElements (inter-CM coexistence discovery) or allCoexistenceSetElements (inter-CM and intra-CM coexistence discovery)) |

When the SubscriptionRequest is received from the CM, the CDIS generates a SubscriptionResponse message and sends the SubscriptionResponse message to the CM. When generating the SubscriptionReponse message, the CDIS sets CxMessage parameters of the SubscriptionResponse message as shown in Table 3.

TABLE 3

| Parameter | Data type | Value |
|---|---|---|
| header | CxHeader | requestID |
| payload | CxPayload | subscriptionResponse |

Table 4 shows a parameter of a subscriptionResponse payload.

TABLE 4

| Parameter | Data type | Description |
|---|---|---|
| status | BOOLEAN | Status |

CM Subscription Update

When a CM intends to change the type of a discovery service provided by a CDIS, the CM may perform a CM subscription update procedure. In this process, the CM generates a SubscriptionRequest message, sends the SubscriptionRequest message to the CDIS, and then waits for a SubscriptionResponse message from the CDIS. CxMessage parameters and payloads of the SubscriptionRequest message and the SubscriptionResponse message are same as those shown in Tables 1 to 4.

Figure 3:
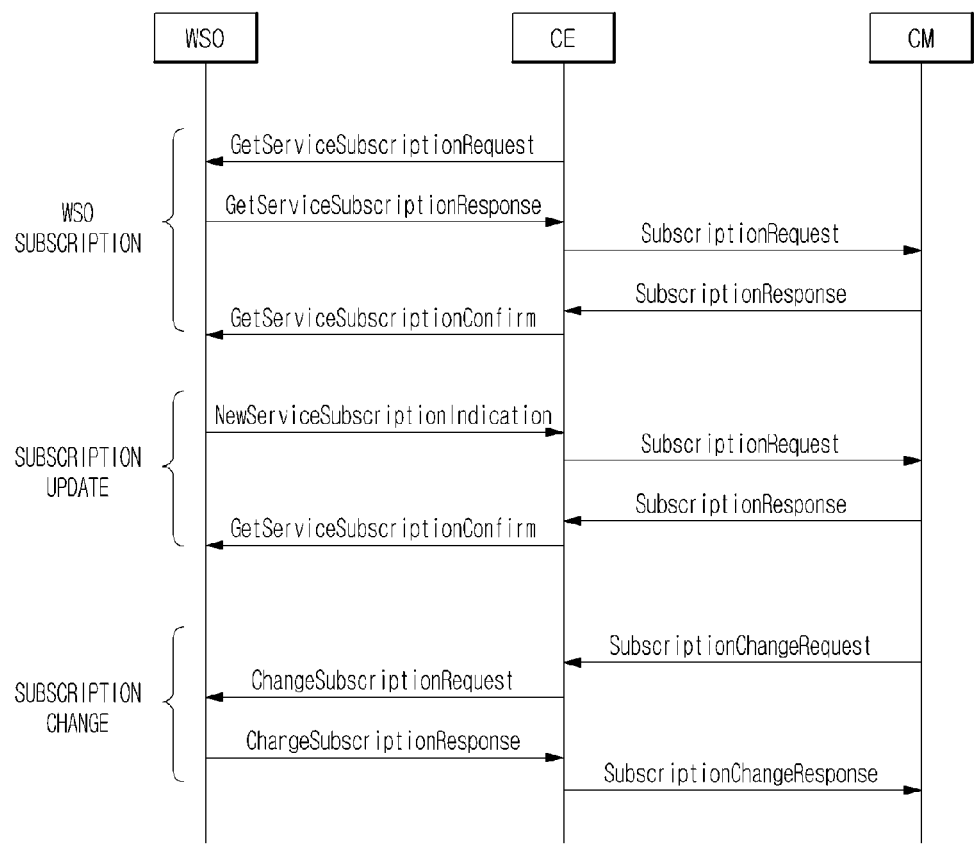
FIG. 3 shows white space object (WSO) subscription, subscription update, and subscription change procedures according to an exemplary embodiment of the present invention.

FIG. 3 shows WSO subscription, subscription update, and subscription change procedures according to an exemplary embodiment of the present invention. For convenience of description, the respective procedures are sequentially shown in FIG. 3, but those of ordinary skill in the art would appreciate that the procedures are not necessarily performed in the shown sequence.

WSO Subscription

When a request for the start of an operation is received, a CE may perform a WSO subscription procedure to cause a frequency sharing device (WSO) associated with the CE to subscribe to a coexistence service provided by a CM.

First, the CE generates a GetServiceSubscriptionRequest primitive, sends the GetServiceSubscriptionRequest primitive to the WSO served by the CE, and then waits for a GetServiceSubscriptionResponse primitive from the WSO.

Table 5 shows parameters of a GetServiceSubscriptionResponse primitive. For example, a GetServiceSubscriptionResponse primitive may include the parameter "subscribedService" indicating whether a subscribed service type is a management service or an information service.

TABLE 5

| Parameter | Data type | Description |
|---|---|---|
| subscribedService | SubscribedService | Coexistence service (management or information service) to which WSO subscribes |
| status | CxMediaStatus | Status |

After receiving a GetServiceSubscriptionResponse primitive from the WSO, the CE generates a SubscriptionRequest message, sends the SubscriptionRequest message to the CM, and then waits for a SubscriptionResponse message from the CM.

Here, CxMessage parameters and a subscriptionRequest payload of the SubscriptionRequest message are shown in Tables 6 and 7, respectively. As shown in Table 7, the payload of the SubscriptionRequest message may include the subscribedService parameter received through the GetServiceSubscriptionResponse primitive received from the WSO.

TABLE 6

| Parameter | Data type | Value |
|---|---|---|
| header | CxHeader | requestID |
| payload | CxPayload | subscriptionRequest |

TABLE 7

| Parameter | Data type | Description |
|---|---|---|
| subscribedService | SubscribedService | SubscribedService parameter received through GetServiceSubscriptionResponse primitive |

When the SubscriptionRequest message is received, the CM generates the SubscriptionResponse message and sends the SubscriptionResponse message to the CE.

In an exemplary embodiment, CxMessage parameters of the SubscriptionResponse message are as shown in Table 8, and a subscriptionResponse payload is as shown in Table 9.

TABLE 8

| Parameter | Data type | Value |
|---|---|---|
| header | CxHeader | requestID |
| payload | CxPayload | subscriptionResponse |

TABLE 9

| Parameter | Data type | Description |
|---|---|---|
| status | CxMediaStatus | Status |

Next, after receiving the SubscriptionResponse message from the CM, the CE may generate a GetServiceSubscriptionConfirm primitive and send the GetServiceSubscriptionConfirm primitive to the WSO.

A parameter of the GetServiceSubscriptionConfirm primitive is shown in Table 10. As shown in Table 10, the GetServiceSubscriptionConfirm primitive indicates whether or not subscription was successful.

TABLE 10

| Parameter | Data type | Description |
|---|---|---|
| status | CxMediaStatus | Indication of whether or not subscription was successful or not |

WSO Subscription Update

When new WSO subscription information, indicating that a change of a coexistence service provided by a coexistence system is wanted, is received from the WSO, the CE may perform a WSO subscription update procedure for a subscription update of the coexistence service.

In an exemplary embodiment, when a NewServiceSubscriptionIndication primitive is received from the WSO, the CE generates a SubscriptionRequest message, sends the SubscriptionRequest message to the CM serving the CE, and waits for a SubscriptionResponse message from the CM.

In an exemplary embodiment, the NewServiceSubscriptionIndication primitive may include a subscribed service type parameter as shown in a table below.

TABLE 11

| Parameter | Data type | Description |
|---|---|---|
| subscribedService | SubscribedService | Coexistence service (management or information service) to which WSO subscribes |

When generating the SubscriptionRequest message, the CE sets CxMessage parameters of the SubscriptionRequest message as shown in Table 12 below, and a value indicating a subscribed service type included in the NewServiceSubscriptionIndication primitive received from the WSO may be included as a SubscribedService payload.

TABLE 12

| Parameter | Data type | Value |
|---|---|---|
| header | CxHeader | requestID |
| payload | CxPayload | subscriptionRequest |

TABLE 13

| Parameter | Data type | Description |
|---|---|---|
| subscribedService | SubscribedService | SubscribedService parameter received through NewServiceSubscriptionIndication primitive |

After receiving the SubscriptionRequest message from the CE, the CM generates a SubscriptionResponse message and sends the SubscriptionResponse message to the CE.

In an exemplary embodiment, CxMessage parameters and a payload of the SubscriptionResponse message are as shown in Tables 14 and 15.

TABLE 14

| Parameter | Data type | Value |
|---|---|---|
| header | CxHeader | requestID |
| payload | CxPayload | subscriptionResponse |

TABLE 15

| Parameter | Data type | Description |
|---|---|---|
| status | CxMediaStatus | Status |

After receiving the SubscriptionResponse message from the CM, the CE generates a GetServiceSubscriptionConfirm primitive and sends the GetServiceSubscriptionConfirm primitive to the WSO. In an exemplary embodiment, a parameter of the GetServiceSubscriptionConfirm primitive is as shown below.

TABLE 16

| Parameter | Data type | Description |
|---|---|---|
| status | CxMediaStatus | Indication of whether the subscription was successful or not |

WSO Subscription Change

When the CM intends to request a change of the type of a coexistence service provided by the CM from the WSO, the CM may perform a WSO subscription change procedure.

The CM may perform the procedure when it is determined that the WSO is not suitable for the current coexistence service (information or management service). When the CM performs the procedure, the WSO should change its coexistence service from the current coexistence service to the other service.

First, the CM generates a SubscriptionChangeRequest message, sends the SubscriptionChangeRequest message to the CE, and then waits for a SubscriptionChangeResponse message.

In an exemplary embodiment, CxMessage parameters and a payload of the SubscriptionChangeRequest message are shown in Tables 17 and 18 below.

TABLE 17

| Parameter | Data type | Value |
|---|---|---|
| header | CxHeader | requestID |
| payload | CxPayload | subscriptionChangeRequest |

TABLE 18

| Parameter | Data type | Description |
|---|---|---|
| newSubscribedService | SubscribedService | Proposed new subscribed coexistence service (management or information) |

After receiving the SubscriptionChangeRequest message from the CM, the CE generates a ChangeSubscriptionRequest primitive, sends the ChangeSubscriptionRequest primitive to the WSO, and waits for a ChangeSubscriptionResponse primitive from the WSO.

In an exemplary embodiment, a parameter of the ChangeSubscriptionResponse primitive is as shown Table 19.

TABLE 19

| Parameter | Data type | Description |
|---|---|---|
| newSubscribedService | SubscribedService | SubscribedService parameter received through SubscriptionChangeRequest message |

After receiving a ChangeSubscriptionResponse primitive from the WSO, the CE generates a SubscriptionChangeResponse message and sends the SubscriptionChangeResponse message to the CM.

In an exemplary embodiment, a parameter of the ChangeSubscriptionResponse primitive is shown in Table 20, and CxMessage parameters of the SubscriptionChangeResponse message generated by the CE and a parameter in a subscriptionChangeResponse payload are as shown in Tables 21 and 22, respectively.

TABLE 20

| Parameter | Data type | Description |
|---|---|---|
| status | CxMediaStatus | Indication of whether or not CE has accepted subscription change request |

TABLE 21

| Parameter | Data type | Value |
|---|---|---|
| header | CxHeader | requestID |
| payload | CxPayload | subscriptionChangeResponse |

TABLE 22

| Parameter | Data type | Description |
|---|---|---|
| status | CxMediaStatus | Status |

Figure 4:
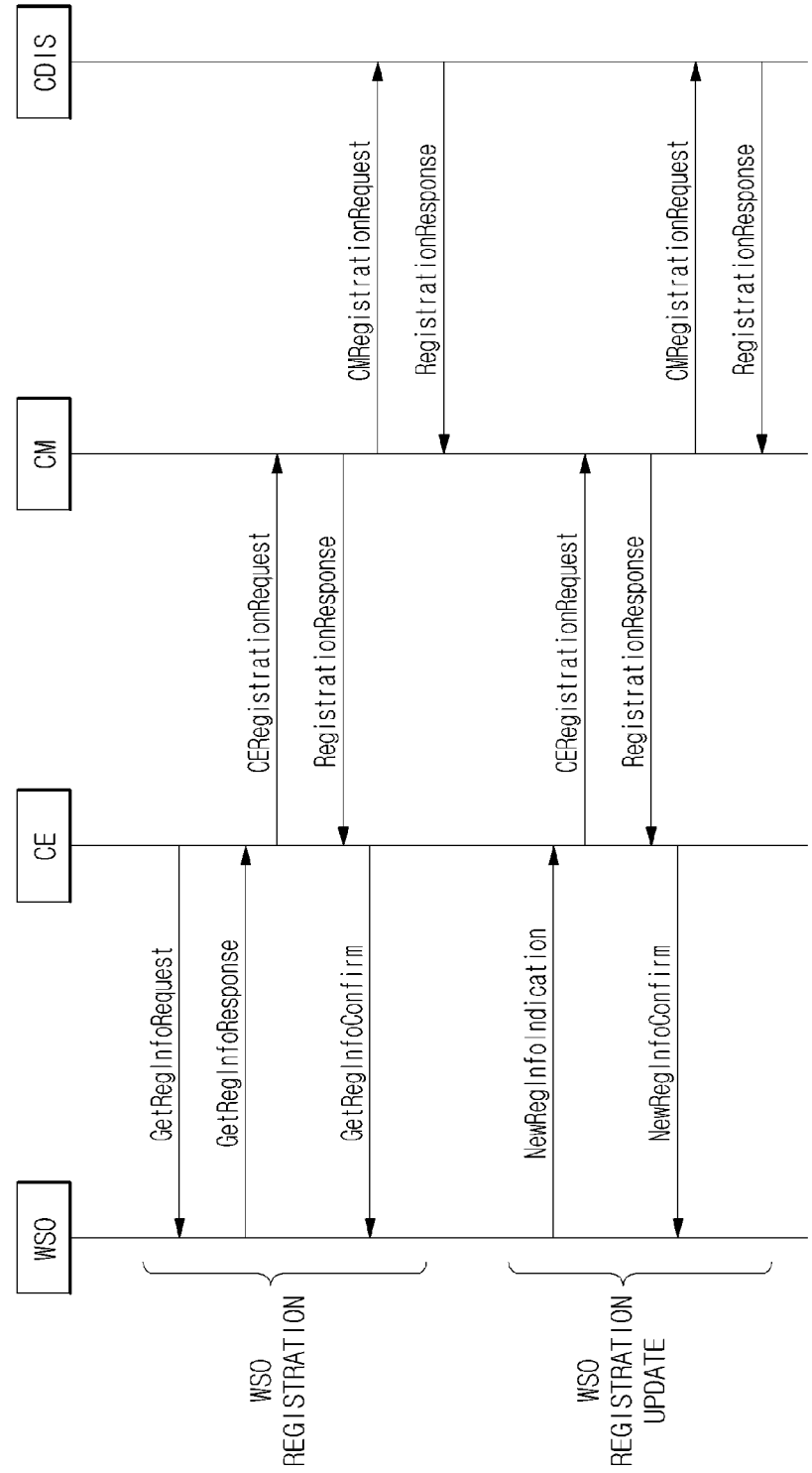
FIG. 4 shows WSO registration and registration update procedures according to an exemplary embodiment of the present invention.

FIG. 4 shows WSO registration and registration update procedures according to an exemplary embodiment of the present invention.

WSO Registration

When a WSO subscription procedure is successfully completed, a CE and a CM perform a WSO registration procedure to register the WSO in the CM and a CDIS.

First, after successfully finishing the WSO subscription procedure, the CE generates a GetRegInfoRequest primitive, sends the GetRegInfoRequest primitive to the WSO, and waits for a GetRegInfoResponse primitive from the WSO.

In an exemplary embodiment, parameters of the GetRegInfoRequest primitive are as shown in Table 23 below.

TABLE 23

| Parameter | Data type | Description |
|---|---|---|
| networkID | OCTET STRING | Identifier of network which the WSO represents. For example, in case of Institute of Electrical and Electronics Engineers (IEEE) 802.11, this parameter contains basic service set ID (BSSID) used by WSO. |
| networkTechnology | NetworkTechnology | Indication of wireless radio access technology used by WSO |
| networkType | NetworkType | Indication of network type specified in regulations |
| discoveryInformation | DiscoveryInformation | Discovery information of WSO |
| txScheduleSupported | BOOLEAN | Indication of whether or not scheduled transmission is supported |
| listOfAvailableChNumbers | ListOfAvailableChNumbers | Information about available white space channels(see table below) |

TABLE 23-continued

| Parameter | Data type | Description |
|---|---|---|
| listOfSupportedChNumbers | SEQUENCE OF INTEGER | List of Supported channel numbers |
| listOfOperatingChNumbers | ListOfOperatingChNumbers | WSO operating channel numbers |
| requiredResource | RequiredResource | Resources required for WSO operation |
| measurementCapability | MeasurementCapability | Measurement capability of WSO (energy detection or failure detection) |
| mobilityInformation | MobilityInformation | WSO mobility information |

Table 24 shows data types of each element of the sequence in the listOfAvailableChNumbers parameter.

TABLE 24

| Parameter | Data type | Description |
|---|---|---|
| channelNumber | INTEGER | Available channel number |
| availableStartTime | GeneralizedTime | Available start time of available channel number if applicable |
| availableDuration | REAL | Available duration of available channel number if applicable |
| constOfChUses | ConstOfChUses | Constraints (this parameter is not used when there is no constraint) |

Table 25 shows data types of respective elements of a sequence in the listOfOperatingChNumbers parameter among the above parameters.

TABLE 25

| Parameter | Data type | Description |
|---|---|---|
| ChannelNumber | INTEGER | Operating channel number |
| occupancy | REAL | This parameter is not used when occupancy is not known, and indicates value of occupancy (from 0 to 1) when occupancy is known. |

Table 26 shows data types of the requiredResource parameter among the above parameters.

TABLE 26

| Parameter | Data type | Description |
|---|---|---|
| requiredBandwidth | REAL | Required Bandwidth for WSO operation |
| occupancy | REAL | Expected occupancy (this parameter is not used when expected occupancy is not known, and indicates value of expected occupancy (from 0 to 1) when expected occupancy is known) |

Table 27 shows data types of the mobilityInformation parameter.

TABLE 27

| Parameter | Data type | Description |
|---|---|---|
| maxSpeed | REAL | This parameter optionally exists. This parameter is set to indicate maximum speed value (km/h) of WSO. |
| speedInformation | SpeedInformation | This parameter optionally exists. This parameter is set to indicate detailed information on speed and direction of WSO. |
| routeInformation | RouteInformation | This parameter optionally exists. This parameter is set to indicate planned route and time of WSO. |

After receiving a GetRegInfoResponse primitive from the WSO, the CE generates a CERegistrationRequest message, sends the CERegistrationRequest message to the CM serving the CE, and waits for a RegistrationResponse message from the CM.

In an exemplary embodiment, CxMessage parameters and the payload structure of the CERegistrationRequest message are as shown in Tables 28 and 29, respectively.

TABLE 28

| Parameter | Data type | Value |
|---|---|---|
| header | CxHeader | requestID |
| payload | CxPayload | ceRegistrationRequest |

TABLE 29

| Parameter | Data type | Description |
|---|---|---|
| operationCode | OperationCode | Operation code (new) |
| networkID | OCTET STRING | Identifier of network which the WSO represents. For example, in case of |

TABLE 29-continued

| Parameter | Data type | Description |
|---|---|---|
| networkTechnology | NetworkTechnology | IEEE 802.11, this parameter contains BSSID used by WSO.. Indication of wireless radio access technology used by WSO |
| networkType | NetworkType | Indication of network type specified in regulations |
| discoveryInformation | DiscoveryInformation | Discovery information of WSO |
| txScheduleSupported | BOOLEAN | Indication of whether or not scheduled transmission is supported |
| listOfAvailableChNumbers | ListOfAvailableChNumbers | Information on available channels, available channel information |
| listOfSupportedChNumbers | SEQUENCE OF INTEGER | Supported channel numbers |
| listOfOperatingChNumbers | ListOfOperatingChNumbers | WSO operating channel numbers |
| requiredResource | RequiredResource | Resources required for WSO operation |
| measurementCapability | MeasurementCapability | Measurement capability of WSO (energy detection or failure detection) |
| mobilityInformation | MobilityInformation | WSO mobility information |

In an exemplary embodiment, CxMessage parameters of a RegistrationResponse message are as shown in Table 30.

TABLE 30

| Parameter | Data type | Value |
|---|---|---|
| header | CxHeader | requestID |
| payload | CxPayload | registrationResponse |

After receiving a RegistrationResponse message from the CM, the CE generates a GetRegInfoConfirm primitive and sends the GetRegInfoConfirm primitive to the WSO.

In an exemplary embodiment, a parameter of the GetRegInfoConfirm primitive is as shown below.

TABLE 31

| Parameter | Data type | Description |
|---|---|---|
| status | CxMediaStatus | Indication of whether or not registration was successful or not |

Meanwhile, after sending the RegistrationResponse message to the CE, the CM generates a CMRegistrationRequest message, sends the CMRegistrationRequest message to the CDIS serving the CM, and waits for a RegistrationResponse message from the CDIS.

In an exemplary embodiment, CxMessage parameters and payloads of the CMRegistrationRequest message are as shown in Tables 32 and 33, respectively.

TABLE 32

| Parameter | Data type | Value |
|---|---|---|
| header | CxHeader | requestID |
| payload | CxPayload | cmRegistrationRequest |

TABLE 33

| Parameter | Data type | Description |
|---|---|---|
| operationCode | OperationCode | Operation code (new) |
| ceID | CxID | CE ID |
| networkID | OCTET STRING | Network ID of WSO. For example, in case of IEEE 802.11, this parameter indicates BSSID used by WSO. |
| networkTechnology | NetworkTechnology | Indication of wireless radio access technology used by WSO |
| networkType | NetworkType | Indication of network type specified in regulations |
| discoveryInformation | DiscoveryInformation | Discovery information of WSO |
| listOfSupportedChNumbers | SEQUENCE OF INTEGER | List of supported channel numbers |

In an exemplary embodiment, CxMessage parameters of the RegistrationResponse message generated by the CDIS are as shown in Table 34.

TABLE 34

| Parameter | Data type | Value |
|---|---|---|
| header | CxHeader | requestID |
| payload | CxPayload | RegistrationResponse |

WSO Registration Update

When the CE receives new WSO registration information, the CE and the CM may perform a WSO registration update procedure to update the registration information of the WSO.

First, when a NewRegInfoIndication primitive is received from the WSO, the CE generates a CERegistrationRequest message, sends the CERegistrationRequest message to the CM, and waits for a RegistrationResponse message from the CM.

In an exemplary embodiment, parameters of the NewRegInfoIndication primitive are as shown in a table below.

TABLE 35

| Parameter | Data type | Description |
|---|---|---|
| operationCode | OperationCode | Operation code (modify) |
| networkID | OCTET STRING | Network ID of WSO. For example, in case of IEEE 802.11, this parameter indicates BSSID used by WSO. |
| networkTechnology | NetworkTechnology | Indication of wireless radio access technology used by WSO |
| networkType | NetworkType | Indication of network type specified in regulations |
| discoveryInformation | DiscoveryInformation | Discovery information of WSO |
| txScheduleSupported | BOOLEAN | Indication of whether or not scheduled transmission is supported |
| listOfAvailableChNumbers | ListOfAvailableChNumbers | Information on available white space channels, available channel number list |
| listOfSupportedChNumbers | SEQUENCE OF INTEGER | List of supported channel numbers |
| listOfOperatingChNumbers | ListOfOperatingChNumbers | List of WSO operating channel numbers |
| requiredResource | RequiredResource | Resources required for WSO operation |
| measurementCapability | MeasurementCapability | Measurement capability of WSO (energy detection or failure detection) |
| mobilityInformation | MobilityInformation | WSO mobility information |

In an exemplary embodiment, CxMessage parameters of a RegistrationResponse message are as shown below.

TABLE 36

| Parameter | Data type | Value |
|---|---|---|
| header | CxHeader | requestID |
| payload | CxPayload | RegistrationResponse |

After receiving a RegistrationResponse message from the CM, the CE generates a NewRegInfoConfirm primitive and sends the NewRegInfoConfirm primitive to the WSO.

In an exemplary embodiment, a parameter of the NewRegInfoConfirm primitive is as shown below.

TABLE 37

| Parameter | Data type | Description |
|---|---|---|
| status | CxMediaStatus | Indication of whether or not registration was successful |

Meanwhile, after sending the RegistrationResponse message to the CE, the CM generates a CMRegistrationRequest message, sends the CMRegistrationRequest message to the CDIS, and waits for a RegistrationResponse message from the CDIS.

In an exemplary embodiment, CxMessage parameters and payloads of the CMRegistrationRequest message are as shown in Tables 38 and 39, respectively.

TABLE 38

| Parameter | Data type | Value |
|---|---|---|
| header | CxHeader | requestID |
| payload | CxPayload | cmRegistrationRequest |

TABLE 39

| Parameter | Data type | Description |
|---|---|---|
| operationCode | OperationCode | Operation code (new, modify, remove) |
| ceID | CxID | CE ID |
| networkID | OCTET STRING | Network ID of WSO. For example, in case of IEEE 802.11, this parameter indicates BSSID used by WSO. |
| networkTechnology | NetworkTechnology | Indication of wireless radio access technology used by WSO |
| networkType | NetworkType | Indication of network type specified in regulations |
| discoveryInformation | DiscoveryInformation | Discovery information of WSO |
| listOfSupportedChNumbers | SEQUENCE OF INTEGER | List of supported channel numbers |

In an exemplary embodiment, CxMessage parameters of a RegistrationResponse message received from the CDIS are as shown in a table below.

TABLE 40

| Parameter | Data type | Value |
|---|---|---|
| header | CxHeader | requestID |
| payload | CxPayload | RegistrationResponse |

WSO Reconfiguration for Management Service

Figure 5:
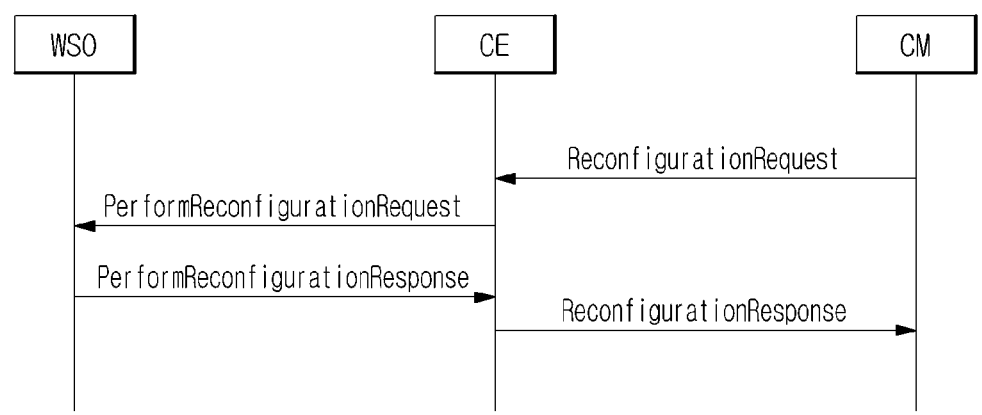
FIG. 5 shows a WSO reconfiguration procedure according to an exemplary embodiment of the present invention.

When reconfiguration is necessary for at least one WSO that subscribes to a management service provided by a CM and is under management as the CM performs a new coexistence decision making, the CM and a CE may perform a WSO reconfiguration procedure. FIG. 5 shows a WSO reconfiguration procedure according to an exemplary embodiment of the present invention.

First, the CM generates a ReconfigurationRequest message, sends the ReconfigurationRequest message to a CE that provides service to the WSO requiring reconfiguration, and then waits for a ReconfigurationResponse message from the CE. In an exemplary embodiment, the number of ReconfigurationRequest messages equals the number of WSOs requiring reconfiguration.

In an exemplary embodiment, CxMessage parameters and payloads of the ReconfigurationRequest message are as shown in Tables 41 and 42, respectively.

TABLE 41

| Parameter | Data type | Value |
|---|---|---|
| header | CxHeader | requestID |
| payload | CxPayload | reconfigurationRequest |

TABLE 42

| Parameter | Data type | Description |
|---|---|---|
| OperatingChNumbers | SEQUENCE OF INTEGER | Operating channel list of WSO |
| txPowerLimit | REAL | Transmission power limitation |
| channelIsShared | BOOLEAN | Indication of whether or not channel is shared. True when frequency is shared with another WSO, and false otherwise. |
| txSchedule | txSchedule | Transmission schedule |
| chClassInfo | ChClassInfo | Channel classification information |

A table below shows data types of the chClassInfo parameter.

TABLE 43

| Parameter | Data type | Description |
|---|---|---|
| availableChannelList | SEQUENCE OF INTEGER | Available channel list |
| restrictedChannelList | SEQUENCE OF INTEGER | Restricted channel list |
| protectedChannelList | SEQUENCE OF INTEGER | Protected channel list |
| unclassifiedChannelList | SEQUENCE OF INTEGER | Unclassified channel list |
| operatingChannelList | SEQUENCE OF OperatingChannelInfo | Operating channel list |

TABLE 43-continued

| Parameter | Data type | Description |
|---|---|---|
| coexistenceChannelList | SEQUENCE OF OperatingChannelInfo | Coexistence channel list |

After receiving the ReconfigurationRequest message from the CM, the CE generates a PerformReconfigurationRequest primitive, sends the PerformReconfigurationRequest primitive to the WSO, and waits for a PerformReconfigurationResponse primitive from the WSO.

A table below shows parameters of the PerformReconfigurationRequest primitive.

TABLE 44

| Parameter | Data type | Description |
|---|---|---|
| listOfOperatingChNumber | SEQUENCE OF INTEGER | Operating channel list received through ReconfigurationRequest message |
| txPowerLimit | REAL | Transmission power limitation received through ReconfigurationRequest message |
| channelIsShared | BOOLEAN | Shared channel list received through ReconfigurationRequest message |
| txSchedule | txSchedule | Transmission schedule received through ReconfigurationRequest message |

After receiving a PerformReconfigurationResponse primitive from the WSO, the CE generates a ReconfigurationResponse message and sends the ReconfigurationResponse message to the CM.

In an exemplary embodiment, parameters of the PerformReconfigurationResponse primitive from the WSO are as shown in a table below.

TABLE 45

| Parameter | Data type | Description |
|---|---|---|
| status | BOOLEAN | Reconfiguration parameter |
| Failed parameters | Failed parameters | Failure parameter (information indicating that reconfiguration has failed) |

In an exemplary embodiment, data types of CxMessage parameters and parameters of payloads of a ReconfigurationResponse message generated by the CE are as shown in Tables 46 and 47 below, respectively.

TABLE 46

| Parameter | Data type | Value |
|---|---|---|
| header | CxHeader | requestID |
| payload | CxPayload | reconfigurationResponse |

TABLE 47

| Parameter | Data type | Description |
|---|---|---|
| status | BOOLEAN | Reconfiguration parameter received through PerformReconfigurationResponse primitive |
| Failed parameters | Failed parameters | Failure parameter received through PerformReconfigurationResponse primitive |

WSO Deregistration

Figure 6:
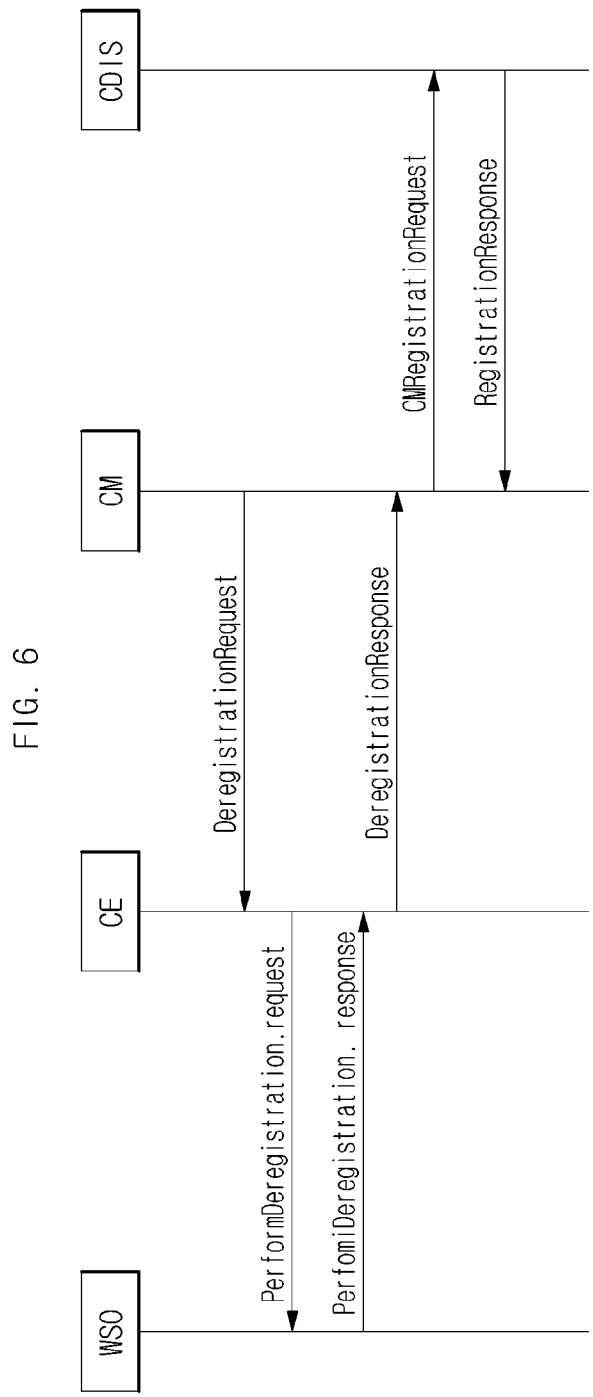
FIG. 6 shows a WSO deregistration procedure according to an exemplary embodiment of the present invention.

FIG. 6 shows a WSO deregistration procedure according to an exemplary embodiment of the present invention.

To deregister a WSO/CE that has subscribed to a management service but does not accept a reconfiguration request of a CM from the CM, the CM and the CE may perform a WSO deregistration procedure. When the CM performs this procedure, the WSO/CE should select and perform one of the following:

Switch from a management service to an information service

Subscription to and registration for a management service provided by a new CM

As shown in FIG. 6, the CM first generates a DeregistrationRequest message, sends the DeregistrationRequest message to the CE, and then waits for a DeregistrationResponse message from the CE.

In an exemplary embodiment, CxMessage parameters of the DeregistrationRequest message are as shown below.

TABLE 48

| Parameter | Data type | Value |
|---|---|---|
| header | CxHeader | requestID |
| payload | CxPayload | deregistrationRequest |

After receiving the DeregistrationRequest message from the CM, the CE generates a PerformDeregistrationRequest primitive, sends the PerformDeregistrationRequest primitive to the WSO, and waits for a PerformDeregistrationResponse primitive from the WSO.

In an exemplary embodiment, parameters of the PerformDeregistrationRequest primitive and a PerformDeregistrationResponse primitive are as shown in Tables 49 and 50, respectively.

TABLE 49

| Parameter | Data type | Description |
|---|---|---|
| wsoDeregistration | BOOLEAN | TRUE |

TABLE 50

| Parameter | Data type | Description |
|---|---|---|
| status | BOOLEAN | status |

After receiving a PerformDeregistrationResponse primitive from the WSO, the CE generates a DeregistrationResponse message and sends the DeregistrationResponse message to the CM.

In an exemplary embodiment, CxMessage parameters and a payload of the DeregistrationResponse message are as shown in Tables 51 and 52, respectively.

TABLE 51

| Parameter | Data type | Value |
|---|---|---|
| header | CxHeader | requestID |
| payload | CxPayload | deregistrationResponse |

TABLE 52

| Parameter | Data type | Description |
|---|---|---|
| status | CxMediaStatus | status |

After receiving the DeregistrationResponse message from the CE, the CM generates a CMRregistrationRequest message, sends the CMRregistrationRequest message to a CDIS serving the CM, and waits for a RegistrationResponse message from the CDIS.

In an exemplary embodiment, CxMessage parameters and payloads of the CMRegistrationRequest message are as shown in Tables 53 and 54 below, respectively. As shown in Table 54, an operation code included in a payload of the message may be indicated as "removal."

TABLE 53

| Parameter | Data type | Value |
|---|---|---|
| header | CxHeader | requestID |
| payload | CxPayload | CMRegistrationRequest |

TABLE 54

| Parameter | Data type | Description |
|---|---|---|
| operationCode | OperationCode | Operation code ("removal" is selected) |
| ceID | CxID | CE ID |
| networkID | OCTET STRING | Not used |
| networkTechnology | NetworkTechnology | Not used |
| networkType | NetworkType | Not used |
| discoveryInformation | DiscoveryInformation | Not used |
| listOfSupportedChNumbers | SEQUENCE OF INTEGER | Not used |

CxMessage parameters of a RegistrationResponse message received from the CDIS are as shown in a table below.

TABLE 55

| Parameter | Data type | Value |
|---|---|---|
| header | CxHeader | requestID |
| payload | CxPayload | RegistrationResponse |

Figure 7:
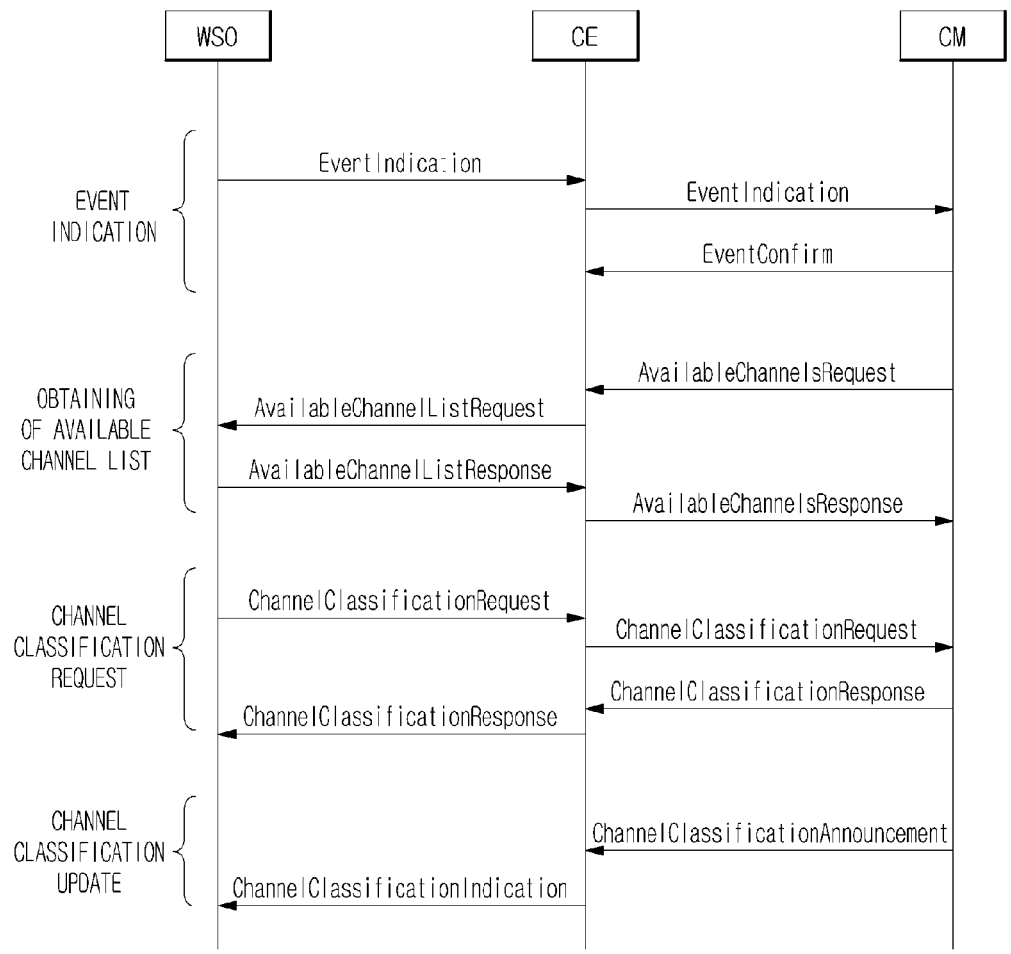
FIG. 7 shows a message delivery procedure between a CM and a coexistence enabler (CE) according to an exemplary embodiment of the present invention.

FIG. 7 shows a message delivery procedure between a CM and a CE according to an exemplary embodiment of the present invention, and more specifically, an event indication procedure, an obtaining available channel list procedure, a channel classification request procedure, and a channel classification update procedure in sequence. For convenience of description, the procedures are sequentially shown in FIG. 7, but those of ordinary skill in the art would appreciate that the procedures are not necessarily performed in the shown sequence.

Event Indication to CM

To notify a CM of the occurrence of an event, a CE may perform a procedure of sending an event indication from the CE to the CM.

After receiving an EventIndication primitive from a WSO, the CE generates an EventIndication message, sends the EventIndication message to a CM serving the CE, and waits for an EventConfirm message from the CM.

In an exemplary embodiment, a parameter of the EventIndication primitive is as shown in Table 56.

TABLE 56

| Parameter | Data type | Description |
|---|---|---|
| eventParams | EventParams | Event parameter list |

When the CE generates the EventIndication message, CxMessage parameters of the EventIndication message are set as shown in a table below.

TABLE 57

| Parameter | Data type | Value |
|---|---|---|
| header | CxHeader | requestID |
| payload | CxPayload | eventIndication |

A parameter of an eventIndication payload is as shown in a table below.

TABLE 58

| Parameter | Data type | Description |
|---|---|---|
| eventParams | EventParams | Event parameter list (a signal-to-interference-plus-noise ratio (SINR) threshold reached or quality of service (QoS)) degradation received through EventIndication primitive |

After receiving the EventIndication message from the CE, the CM generates an EventConfirm message and sends the EventConfirm message to the CE.

In an exemplary embodiment, CxMessage parameters of the EventConfirm message are as shown below.

TABLE 59

| Parameter | Data type | Value |
|---|---|---|
| header | CxHeader | requestID |
| payload | CxPayload | eventConfirm |

Obtaining Available Channel List from WSO

In order for the CM to obtain available channel list information from the WSO, the CM and the CE may perform a procedure of obtaining an available channel list from the WSO.

The CM generates an AvailableChannelsRequest message, sends the AvailableChannelsRequest message to the CE serving the WSO, and then waits for an AvailableChannelsResponse message from the CE.

In an exemplary embodiment, CxMessage parameters of the AvailableChannelsRequest message are as shown below.

TABLE 60

| Parameter | Data type | Value |
|---|---|---|
| header | CxHeader | requestID |
| payload | CxPayload | availableChannelsRequest |

After receiving the AvailableChannelsRequest message from the CM, the CE generates an AvailableChannelsListRequest primitive, sends the AvailableChannelsListRequest primitive to the WSO, and waits for an AvailableChannelsListResponse primitive from the WSO.

In an exemplary embodiment, a parameter of an AvailableChannelsListResponse primitive is as shown below.

TABLE 61

| Parameter | Data type | Description |
|---|---|---|
| listOfAvailableChNumbers | ListOfAvailableChNumbers | Available channel list of shared channel DB |

After receiving an AvailableChannelsListResponse primitive from the WSO, the CE generates an AvailableChannelsResponse message and sends the AvailableChannelsResponse message to the CM.

In an exemplary embodiment, CxMessage parameters and a payload of the AvailableChannelsResponse message are set as shown in Tables 62 and 63 below.

TABLE 62

| Parameter | Data type | Value |
|---|---|---|
| header | CxHeader | requestID |
| payload | CxPayload | availableChannelsResponse |

TABLE 63

| Parameter | Data type | Description |
|---|---|---|
| listOfAvailableChNumbers | ListOfAvailableChNumbers | Available channel number list received through AvailableChannelsListResponse primitive |

Data types of respective elements of a sequence in the listOfAvailableChNumbers parameter are as shown below.

TABLE 64

| Parameter | Data type | Description |
|---|---|---|
| channelNumber | INTEGER | Available channel number |
| availableStartTime | GeneralizedTime | Available start time of available channel number |
| availableDuration | REAL | Available duration of available channel number |
| constOfChUses | ConstOfChUses | Constraints (this parameter is not used when there is no constraint) |

Channel Classification Request by CE

When the WSO needs to obtain channel classification information from the CM through the CE, the CE/CM may perform an obtaining channel classification information procedure to provide channel classification information to the WSO.

First, when a ChannelClassificationRequest primitive is received from the WSO, the CE generates a ChannelClassificationRequest message, sends the ChannelClassificationRequest message to the CM, and waits for a ChannelClassificationResponse message from the CM.

In an exemplary embodiment, a parameter of the ChannelClassificationRequest primitive is as shown below.

TABLE 65

| Parameter | Data type | Description |
|---|---|---|
| listOfNetworkID | SEQUENCE OF OCTET STRING | Network ID list |

In an exemplary embodiment, CxMessage parameters and a payload of the ChannelClassificationRequest message are as shown in Tables 66 and 67, respectively.

TABLE 66

| Parameter | Data type | Value |
| --- | --- | --- |
| header | CxHeader | requestID |
| payload | CxPayload | channelClassificationRequest |

TABLE 67

| Parameter | Data type | Description |
| --- | --- | --- |
| listOfNetworkID | SEQUENCE OF OCTET STRING | Network ID list received through ChannelClassificationRequest primitive |

In an exemplary embodiment, CxMessage parameters and payloads of a ChannelClassificationResponse message are as shown in Tables 68 and 69, respectively.

TABLE 68

| Parameter | Data type | Value |
| --- | --- | --- |
| header | CxHeader | requestID |
| payload | CxPayload | channelClassificationResponse |

TABLE 69

| Parameter | Data type | Description |
| --- | --- | --- |
| networkID | OCTET STRING | Network ID |
| chClassInfo | ChClassInfo | Channel classification information |

In an exemplary embodiment, data elements shown in a table below may be included in the chClassInfo parameter.

TABLE 70

| Parameter | Data type | Description |
| --- | --- | --- |
| availableChannelList | SEQUENCE OF INTEGER | Available channel list |
| restrictedChannelList | SEQUENCE OF INTEGER | Restricted channel list |
| protectedChannelList | SEQUENCE OF INTEGER | Protected channel list |
| unclassifiedChannelList | SEQUENCE OF INTEGER | Unclassified channel list |
| operatingChannelList | SEQUENCE OF OperatingChannelInfo | Operating channel list |
| coexistenceChannelList | SEQUENCE OF OperatingChannelInfo | Coexistence channel list |

After receiving a ChannelClassificationResponse message from the CM, the CE generates a ChannelClassificationResponse primitive and sends the ChannelClassificationResponse primitive to the WSO.

In an exemplary embodiment, a parameter of the ChannelClassificationResponse primitive is as shown below.

TABLE 71

| Parameter | Data type | Description |
| --- | --- | --- |
| chClassInfoList | ChClassInfoList | Channel classification information received through ChannelClassificationResponse primitive |

In the chClassInfo parameter, data elements shown in a table below may be included.

TABLE 72

| Parameter | Data type | Description |
| --- | --- | --- |
| networkID | OCTET STRING | Network ID |
| chClassInfo | ChClassInfo | Channel classification information |

Channel Classification Update to CE

When channel classification information of the CM is updated, the CM may perform a procedure of announcing channel classification information update to the CE to provide channel classification update information to the WSO. When the channel classification information is updated, the CM generates a ChannelClassificationAnnouncement message and sends the ChannelClassificationAnnouncement message to the CE.

In an exemplary embodiment, CxMessage parameters of the ChannelClassificationAnnouncement message and data types of parameters in payloads are as shown in Tables 73 and 74, respectively.

TABLE 73

| Parameter | Data type | Value |
| --- | --- | --- |
| header | CxHeader | requestID |
| payload | CxPayload | channelClassificationAnnouncement |

TABLE 74

| Parameter | Data type | Description |
| --- | --- | --- |
| networkID | OCTET STRING | Network ID |
| chClassInfo | ChClassInfo | Channel classification information |

After receiving the ChannelClassificationAnnouncement message from the CM, the CE generates a ChannelClassificationIndication primitive and sends the ChannelClassificationIndication primitive to the WSO.

In an exemplary embodiment, a parameter of the ChannelClassificationAnnouncement primitive is as shown in Table 75.

TABLE 75

| Parameter | Data type | Description |
| --- | --- | --- |
| chClassInfoList | ChClassInfoList | Channel classification information received through ChannelClassificationAnnouncement message |

In an exemplary embodiment, the chClassInfoList parameter may include data shown below.

TABLE 76

| Parameter | Data type | Description |
| --- | --- | --- |
| networkID | OCTET STRING | Network ID |
| chClassInfo | ChClassInfo | Channel classification information |

Figure 8:
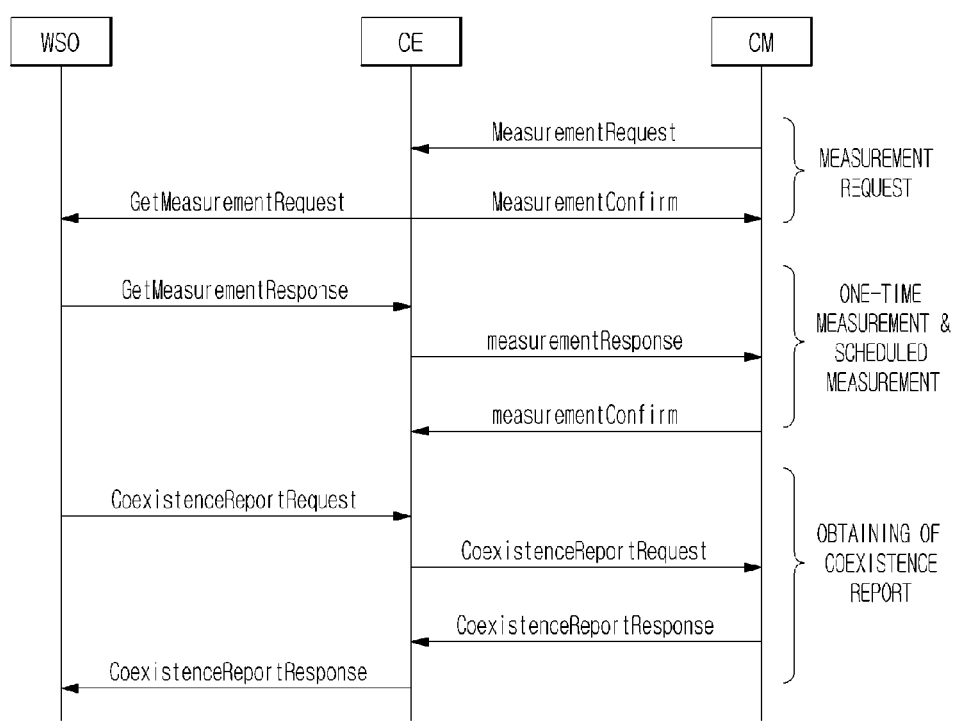
FIG. 8 shows a measurement request procedure, a one-time/scheduled WSO measurement procedure, and an obtaining coexistence report procedure of a CM according to an exemplary embodiment of the present invention.

FIG. 8 shows a measurement request procedure, a one-time/scheduled WSO measurement procedure, and an obtaining coexistence report procedure of a CM according to an exemplary embodiment of the present invention. For convenience of description, the procedures are sequentially shown in FIG. 8, but those of ordinary skill in the art would appreciate that the procedures are not necessarily performed in the shown sequence.

Measurement Request

The CM may request that the WSO indicated by a CE served by the CM perform a measurement, and then perform a measurement request procedure of requesting the provision of a measurement report from the CE. The CM may request that the WSO perform a measurement and provide a measurement report to the CE once per request or based on a schedule.

First, the CM generates a MeasurementRequest message, sends the MeasurementRequest message to the CE, and then waits for a MeasurementConfirm message from the CE.

In an exemplary embodiment, CxMessage parameters of the MeasurementRequest message and a parameter of a measurementRequest payload are as shown in Tables 77 and 78, respectively.

TABLE 77

| Parameter | Data type | Value |
|---|---|---|
| header | CxHeader | requestID |
| payload | CxPayload | measurementRequest |

TABLE 78

| Parameter | Data type | Description |
|---|---|---|
| MeasurementDescription | MeasurementDescription | Measurement description |

In an exemplary embodiment, CxMessage parameters of a MeasurementConfirm message are as shown below.

TABLE 79

| Parameter | Data type | Value |
|---|---|---|
| header | CxHeader | requestID |
| payload | CxPayload | measurementConfirm |

After receiving the MeasurementRequest message from the CM, the CE generates a GetMeasurementRequest primitive and sends the GetMeasurementRequest primitive to the WSO while generating a MeasurementConfirm message and sending the MeasurementConfirm message to the CM.

In an exemplary embodiment, the GetMeasurementRequest primitive is as shown below.

TABLE 80

| Parameter | Data type | Description |
|---|---|---|
| MeasurementDescription | MeasurementDescription | Measurement description received through MeasurementRequest message |

One-Time Measurement

To provide a one-time measurement result of the WSO to the CM, the CE may perform an obtaining one-time measurement procedure.

After receiving a GetMeasurementResponse primitive from the WSO, the CE generates a measurementResponse message, sends the measurementResponse message to the CM, and waits for a measurementConfirm message from the CM.

In an exemplary embodiment, the GetMeasurementResponse primitive is as shown below.

TABLE 81

| Parameter | Data type | Description |
|---|---|---|
| measurementResult | MeasurementResult | Measurement result |

In an exemplary embodiment, CxMessage parameters and a payload of the measurementResponse message sent from the CE to the CM are as shown in Tables 82 and 83, respectively.

TABLE 82

| Parameter | Data type | Value |
|---|---|---|
| header | CxHeader | requestID |
| payload | CxPayload | measurementResponse |

TABLE 83

| Parameter | Data type | Description |
|---|---|---|
| measurementResult | MeasurementResult | Measurement result received through GetMeasurementResponse primitive |

After receiving the measurementResponse message from the CE, the CM generates a measurementConfirm message and sends the measurementConfirm message to the CE.

TABLE 84

| Parameter | Data type | Value |
|---|---|---|
| header | CxHeader | requestID |
| payload | CxPayload | measurementResponse |

TABLE 85

| Parameter | Data type | Description |
|---|---|---|
| measurementResult | MeasurementResult | Measurement result received through GetMeasurementResponse primitive |

In an exemplary embodiment, CxMessage parameters of the measurementConfirm message are as shown below.

TABLE 86

| Parameter | Data type | Value |
|---|---|---|
| header | CxHeader | requestID |
| payload | CxPayload | measurementConfirm |

Scheduled Measurement

To provide a scheduled measurement result of the WSO to the CM, the CE may perform an obtaining scheduled measurement procedure.

After receiving a GetMeasurementResponse primitive from the WSO, the CE generates a measurementResponse message and sends the measurementResponse message to the CM.

In an exemplary embodiment, the GetMeasurementResponse primitive is as shown below.

TABLE 87

| Parameter | Data type | Description |
|---|---|---|
| measurementResult | MeasurementResult | Measurement result |

In an exemplary embodiment, CxMessage parameters and a payload of the measurementResponse message sent from the CE to the CM are as shown in Tables 88 and 89, respectively.

TABLE 88

| Parameter | Data type | Value |
|---|---|---|
| header | CxHeader | requestID |
| payload | CxPayload | measurementResponse |

TABLE 89

| Parameter | Data type | Description |
|---|---|---|
| measurementResult | MeasurementResult | Measurement result received through GetMeasurementResponse primitive |

After receiving the measurementResponse message from the CE, the CM generates a measurementConfirm message and sends the measurementConfirm message to the CE.

In an exemplary embodiment, CxMessage parameters of the measurementConfirm message are as shown below.

TABLE 90

| Parameter | Data type | Value |
|---|---|---|
| header | CxHeader | requestID |
| payload | CxPayload | measurementConfirm |

Coexistence Report: Information Service

When the WSO intends to obtain a coexistence report from the CM, the CE and the CM may perform an obtaining coexistence report procedure to provide coexistence information to the WSO.

After receiving a CoexistenceReportRequest primitive from the WSO, the CE generates a CoexistenceReportRequest message, sends the CoexistenceReportRequest message to the CM, and waits for a CoexistenceReportResponse message from the CM.

In an exemplary embodiment, CxMessage parameters of the CoexistenceReportRequest message are as shown below.

TABLE 91

| Parameter | Data type | Value |
|---|---|---|
| header | CxHeader | requestID |
| payload | CxPayload | coexistenceReportRequest |

In an exemplary embodiment, CxMessage parameters and payloads of a CoexistenceReportResponse message are as shown in Tables 92 and 93, respectively.

TABLE 92

| Parameter | Data type | Value |
|---|---|---|
| header | CxHeader | requestID |
| payload | CxPayload | coexistenceReportResponse |

TABLE 93

| Parameter | Data type | Description |
|---|---|---|
| coexistenceReport | CoexistenceReport | Information on coexistence set elements of WSO in form of coexistence report |
| channelPriority | ChannelPriority | Channel priority |

The parameters of the CoexistenceReport payload may include data types shown in Table 94 below.

TABLE 94

| Parameter | Data type | Description |
|---|---|---|
| networkID | OCTET STRING | Neighbor network ID |
| networkTechnology | NetworkTechnology | Neighbor WSO network technology |
| listOfOperatingChNumbers | ListOfOperatingChNumbers | Neighbor operating channel numbers |

A table below shows the data type of each element of the sequence in the ChannelPriority parameter.

TABLE 95

| Parameter | Data type | Value |
|---|---|---|
| channelNumber | INTEGER | Channel number |
| Priority | INTEGER | Channel priority order |

After receiving a CoexistenceReportResponse message from the CM, the CE may generate a CoexistenceReportResponse primitive and send the CoexistenceReportResponse primitive to the WSO.

In an exemplary embodiment, parameters of the CoexistenceReportResponse primitive are as shown in a table below.

TABLE 96

| Parameter | Data type | Description |
|---|---|---|
| coexistenceReport | CoexistenceReport | Coexistence report information received through CoexistenceReportResponse message |
| channelPriority | ChannelPriority | Channel priority received through CoexistenceReportResponse message |

Figure 9:
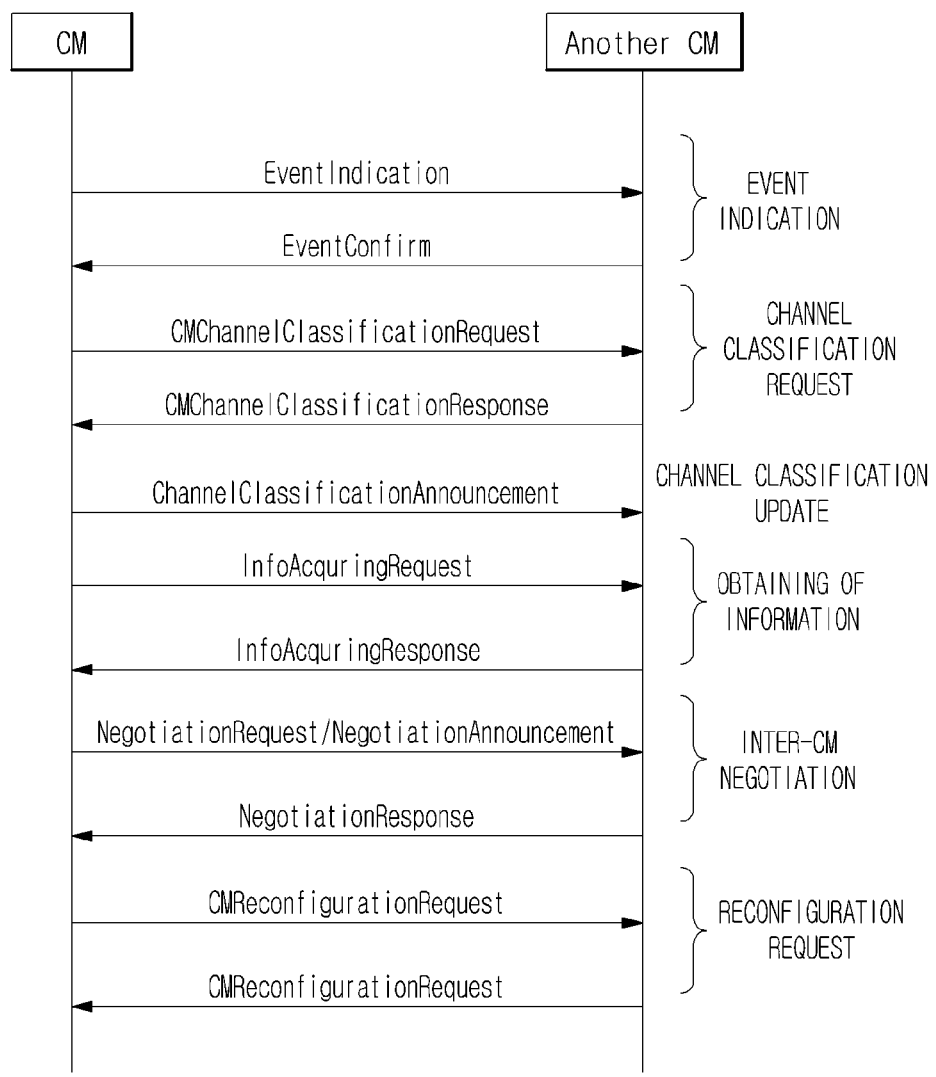
FIG. 9 shows an inter-CM message delivery procedure according to an exemplary embodiment of the present invention.

FIG. 9 shows an inter-CM message delivery procedure according to an exemplary embodiment of the present invention, and more specifically, an event indication procedure, a channel classification request procedure, a channel classification update procedure, an obtaining information procedure, a negotiation procedure, and a reconfiguration request procedure. For convenience of description, the procedures are sequentially shown in FIG. 9, but those of ordinary skill in the art would appreciate that the procedures are not necessarily performed in the shown sequence.

Event Indication to Another CM

A CM may perform a procedure of sending an event indication from the CM to another CM to notify the other CM of an event associated with a coexistence system.

First, the CM generates an EventIndication message, sends the EventIndication message to the other CM, and then waits for an EventConfirm message from the other CM.

In an exemplary embodiment, CxMessage parameters and a payload of the EventIndication message are as shown in Tables 97 and 98, respectively.

TABLE 97

| Parameter | Data type | Value |
|---|---|---|
| header | CxHeader | requestID |
| payload | CxPayload | eventIndication |

TABLE 98

| Parameter | Data type | Description |
|---|---|---|
| eventParams | EventParams | Event list (SINR threshold reached or QoS degradation) |

After receiving the EventIndication message from the CM, the other CM generates an EventConfirm message and sends the EventConfirm message to the CM that has sent the eventIndication message.

Channel Classification Request by CM

To obtain the channel classification information of the other CM, the CM may perform an obtaining channel classification information procedure.

First, the CM generates a CMChannelClassificationRequest message, sends the CMChannelClassificationRequest message to the other CM, and then waits for a CMChannelClassificationResponse message from the other CM.

In an exemplary embodiment, CxMessage parameters and a payload of the CMChannelClassificationRequest message are as shown in Tables 99 and 100, respectively.

TABLE 99

| Parameter | Data type | Value |
|---|---|---|
| header | CxHeader | requestID |
| payload | CxPayload | cmChannelClassificationRequest |

TABLE 100

| Parameter | Data type | Description |
|---|---|---|
| listOfNetworkID | SEQUENCE OF OCTET STRING | Network ID list |

A table below shows CxMessage parameters of a CMChannelClassificationResponse message.

TABLE 101

| Parameter | Data type | Value |
|---|---|---|
| header | CxHeader | requestID |
| payload | CxPayload | cmChannelClassificationResponse |

A table below shows parameters of a cmChannelClassificationResponse payload.

TABLE 102

| Parameter | Data type | Description |
|---|---|---|
| networkID | OCTET STRING | Network ID |
| chClassInfo | ChClassInfo | Channel classification information |

Channel Classification Update to Another CM

To provide updated channel classification information to the other CM, the CM may perform a procedure of announcing channel classification information update to the other CM. When the channel classification information is updated, the CM generates a ChannelClassificationAnnouncement message and sends the ChannelClassificationAnnouncement message to the other CM.

A table below shows CxMessage parameters of the ChannelClassificationAnnouncement message.

TABLE 103

| Parameter | Data type | Value |
|---|---|---|
| header | CxHeader | requestID |
| payload | CxPayload | channelClassificationAnnouncement |

A table below shows parameters of a channelClassificationAnnouncement payload.

TABLE 104

| Parameter | Data type | Description |
|---|---|---|
| networkID | OCTET STRING | Network ID |
| chClassInfo | ChClassInfo | Channel classification information |

Obtaining Information from Another CM

To obtain information from the other CM, the CM may perform a procedure of obtaining information from the other CM.

First, the CM generates an InfoAcquiringRequest message, sends the InfoAcquiringRequest message to the other CM, and then waits for an InfoAcquiringResponse message from the other CM.

When generating the InfoAcquiringRequest message, the CM sets CxMessage parameters as shown in a table below.

TABLE 105

| Parameter | Data type | Value |
|---|---|---|
| header | CxHeader | requestID |
| payload | CxPayload | infoAcquiringRequest |

A table below shows parameters of an infoAcquiringRequest payload.

TABLE 106

| Parameter | Data type | Description |
|---|---|---|
| ceID | CxID | CE ID |
| listOfReqInfoDescr | SEQUENCE OF ReqInfoDescr | Requested information description list (SINR, desired bandwidth, desired occupancy, desired QoS, interface level, fairness index, fairness threshold, and subscribed service) |

A table below shows CxMessage parameters of an infoAcquiringResponse message.

TABLE 107

| Parameter | Data type | Value |
|---|---|---|
| header | CxHeader | requestID |
| payload | CxPayload | infoAcquiringResponse |

A table below shows parameters of the infoAcquiringResponse payload.

TABLE 108

| Parameter | Data type | Description |
|---|---|---|
| ceID | CxID | CE ID |
| reqInfo value | ReqInfo value | Requested information value |

Negotiation Between CMs

To negotiate with the other CM for coexistence decision making, the CM may perform a negotiation procedure between CMs.

First, the CM generates a NegotiationRequest message, sends the NegotiationRequest message to the other CM, and then waits for a NegotiationResponse message from the other CM. Both an etiquette mode and a round-robin mode for a negotiation may be covered by the NegotiationRequest message.

When a competition mode is necessary for the negotiation, the CM may generate a NegotiationAnnouncement message and send the NegotiationAnnouncement message to the other CM.

A table below shows CxMessage parameters of the NegotiationRequest message.

TABLE 109

| Parameter | Data type | Value |
|---|---|---|
| header | CxHeader | requestID |
| payload | CxPayload | negotiationRequest |

A table below shows parameters of a negotiationRequest payload.

TABLE 110

| Parameter | Data type | Description |
|---|---|---|
| negotiationStatus | NegotiationStatus | Negotiation status (success, failure, under negotiation) |
| negotiationInformation | NegotiationInformation | Negotiation information |

In an exemplary embodiment, a data type of NegotiationStatus may be one of the following.

TABLE 111

| Parameter | Data type | Description |
|---|---|---|
| negotiationSuccess | Boolean | Negotiation success |
| negotiationFailure | Boolean | Negotiation failure |
| underNegotiation | Boolean | Under negotiation |

In an exemplary embodiment, a data type of NegotiationInformation may be one of the following.

TABLE 112

| Parameter | Data type | Description |
|---|---|---|
| mode | Boolean | Negotiation success |
| listOfChNumber | SEQUENCE OF INTEGER | Negotiation failure |
| timeSharingUnitInfo | TimeSharingUnitInfo | Under negotiation |
| slotTimePosition | StartEndTime | Allowed slot time position |
| numberOfSlots | INTEGER | Number of slots |
| DisallowedSlotTimePosition | StartEndTime | Disallowed slot time position |
| listOfContentionNumbers | SEQUENCE OF REAL | List of contention numbers |

A table below shows CxMessage parameters of the NegotiationAnnouncement message.

TABLE 113

| Parameter | Data type | Value |
|---|---|---|
| header | CxHeader | requestID |
| payload | CxPayload | negotiationAnnouncement |

A table below shows parameters of a negotiationRequest payload.

TABLE 114

| Parameter | Data type | Description |
|---|---|---|
| listOfWinnerCMID | ListOfWinnerCMID | List of winner CM IDs |
| listOfSlotTimePosition | ListOfSlotTimePosition | List of slot time positions |

Sending Reconfiguration Request from CM to Another CM

To reconfigure a WSO registered in the other CM, the CM may perform a procedure of sending a reconfiguration request from the CM to the other CM.

First, the CM generates a CMReconfigurationRequest message, sends the CMReconfigurationRequest message to the other CM, and then waits for a CMReconfigurationResponse message from the other CM.

In an exemplary embodiment, CxMessage parameters and payloads of the CMReconfigurationRequest message are as shown in Tables 115 and 116 below, respectively.

TABLE 115

| Parameter | Data type | Value |
|---|---|---|
| header | CxHeader | requestID |
| payload | CxPayload | cmReconfigurationRequest |

TABLE 116

| Parameter | Data type | Description |
|---|---|---|
| reconfigTarget | CxID | Indication of CE to be reconfigured |
| OperatingChNumbers | SEQUENCE OF INTEGER | Operating channel list of WSO |
| txPowerLimit | REAL | Transmission power limitation |

TABLE 116-continued

| Parameter | Data type | Description |
| --- | --- | --- |
| channelIsShared | BOOLEAN | True when frequency is shared with another WSO, and false otherwise. |
| txSchedule | txSchedule | Transmission schedule |
| chClassInfo | ChClassInfo | Channel classification information |

The CM generates the above-mentioned payload for each CE registered in the other CM. The total number of payloads equals the number of CEs that are registered in the other CM but managed by the CM.

A table below shows data types of the chClassInfo parameter.

TABLE 117

| Parameter | Data type | Description |
| --- | --- | --- |
| availableChannelList | SEQUENCE OF INTEGER | Available channel list |
| restrictedChannelList | SEQUENCE OF INTEGER | Restricted channel list |
| protectedChannelList | SEQUENCE OF INTEGER | Protected channel list |
| unclassifiedChannelList | SEQUENCE OF INTEGER | Unclassified channel list |
| operatingChannelList | SEQUENCE OF OperatingChannelInfo | Operating channel list |
| coexistenceChannelList | SEQUENCE OF OperatingChannelInfo | Coexistence channel list |

In an exemplary embodiment, CxMessage parameters and payloads of the CMReconfigurationResponse message are as shown in Tables 118 and 119 below, respectively.

TABLE 118

| Parameter | Data type | Value |
| --- | --- | --- |
| header | CxHeader | requestID |
| payload | CxPayload | cmReconfigurationResponse |

TABLE 119

| Parameter | Data type | Description |
| --- | --- | --- |
| reconfigTarget | CxID | Indication for CE to be reconfigured |
| status | BOOLEAN | Reconfiguration parameter received through PerformReconfigurationResponse primitive |
| failedParameters | FailedParameters | Failed parameters received through PerformReconfigurationResponse primitive |

Master/Slave CM Selection

Figure 10:
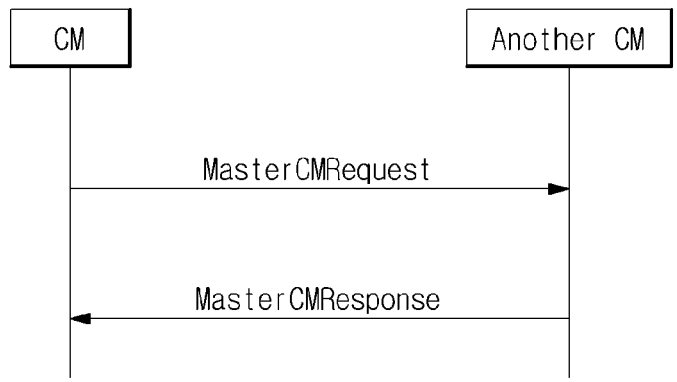
FIG. 10 shows a master/slave CM selection procedure according to an exemplary embodiment of the present invention.

FIG. 10 shows a master/slave CM selection procedure according to an exemplary embodiment of the present invention. To perform centralized decision making, a master CM and a slave CM should be selected. To this end, a CM may perform a master/slave CM selection procedure. A CM intending to be a slave CM may perform the procedure for each of at least one candidate CM wanted to be a master CM. The CM intending to be a slave CM should determine a list of WSOs/CEs to be managed by the master CM.

As shown in FIG. 10, a CM first generates a MasterCMRequest message, sends the MasterCMRequest message to the other CM to notify the other CM that the CM intends to be a slave CM of the other CM receiving the message, and then waits for a MasterCMResponse message from the other CM.

In an exemplary embodiment, CxMessage parameters and a payload of the MasterCMRequest message are as shown in Tables 120 and 121 below, respectively.

TABLE 120

| Parameter | Data type | Value |
| --- | --- | --- |
| header | CxHeader | requestID |
| payload | CxPayload | masterCMRequest |

TABLE 121

| Parameter | Data type | Description |
| --- | --- | --- |
| listOfCEs | SEQUENCE OF CxID | List of CEs managed by CM intending to be slave CM |

When the MasterCMRequest message is received from the CM, the other CM generates a MasterCMResponse message and sends the MasterCMResponse message to the CM.

In an exemplary embodiment, CxMessage parameters and a payload of the MasterCMResponse message are as shown in Tables 122 and 123 below, respectively.

TABLE 122

| Parameter | Data type | Value |
| --- | --- | --- |
| header | CxHeader | requestID |
| payload | CxPayload | masterCMResponse |

TABLE 123

| Parameter | Data type | Description |
| --- | --- | --- |
| Status | CxMediaStatus | status |

Master/Slave CM Configuration

Figure 11:
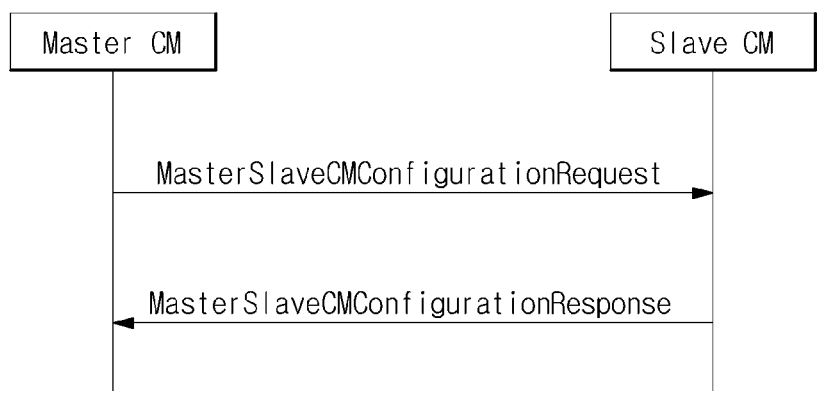
FIG. 11 shows a master/slave CM configuration procedure according to an exemplary embodiment of the present invention.

FIG. 11 shows a master/slave CM configuration procedure according to an exemplary embodiment of the present invention. To perform centralized coexistence decision making, a CM may perform a master/slave CM configuration procedure.

After a master/slave CM selection is successfully completed, as shown in FIG. 11, a master CM first generates a MasterSlaveCMConfigurationRequest message, sends the MasterSlaveCMConfigurationRequest message to a slave CM, and then waits for a MasterSlaveCMConfigurationResponse message from the slave CM.

In an exemplary embodiment, CxMessage parameters and a payload of the MasterSlaveCMConfigurationRequest message are as shown in Tables 124 and 125 below, respectively.

TABLE 124

| Parameter | Data type | Value |
| --- | --- | --- |
| header | CxHeader | requestID |
| payload | CxPayload | masterSlaveCMConfigurationRequest |

TABLE 125

| Parameter | Data type | Description |
|---|---|---|
| listOfCEs | SEQUENCE OF CxID | List of CEs managed by master CM |

After receiving the MasterSlaveCMConfigurationRequest message from the master CM, the slave CM generates a MasterSlaveCMConfigurationResponse message and sends the MasterSlaveCMConfigurationResponse message to the master CM.

In an exemplary embodiment, CxMessage parameters and payloads of the MasterSlaveCMConfigurationResponse message are as shown in Tables 126 and 127 below, respectively.

TABLE 126

| Parameter | Data type | Value |
|---|---|---|
| header | CxHeader | requestID |
| payload | CxPayload | masterSlaveCMConfigurationResponse |

TABLE 127

| Parameter | Data type | Description |
|---|---|---|
| operationCode | OperationCode | Operation code (new, modify, remove) |
| ceID | CxID | Slave CE ID |
| networkID | OCTET STRING | Network ID of WSO. For example, in case of IEEE 802.11, this parameter indicates BSSID used by WSO. |
| networkTechnology | NetworkTechnology | Indication of network technology (wireless radio access technology) used by WSO |
| networkType | NetworkType | Indication of network type specified in regulations |
| discoveryInformation | DiscoveryInformation | Discovery information of WSO |
| txScheduleSupported | BOOLEAN | Indication of whether or not scheduled transmission is supported |
| listOfAvailableChNumbers | ListOfAvailableChNumbers | Information on available white space channels, list of available channel numbers |
| listOfSupportedChNumbers | SEQUENCE OF INTEGER | List of Supported channel numbers |
| listOfOperatingChNumbers | ListOfOperatingChNumbers | List of WSO operating channel numbers |
| requiredResource | RequiredResource | Resources required for WSO operation |
| measurementCapability | MeasurementCapability | Measurement capability of WSO (energy detection or failure detection) |
| mobilityInformation | MobilityInformation | WSO mobility information |

The slave CM generates the above-mentioned payload for each CE to be managed by the master CM. The total number of payloads equals the number of CEs that are registered in the slave CM but managed by the master CM.

In an exemplary embodiment, data types of respective elements of the listOfAvailableChNumbers parameter included in the payloads are as shown in Table 128.

TABLE 128

| Parameter | Data type | Description |
|---|---|---|
| channelNumber | INTEGER | Available channel number |
| availableStartTime | GeneralizedTime | Available start time of available channel number |
| availableDuration | REAL | Available duration of available channel number |
| constOfChUses | ConstOfChUses | Constraints (this parameter is not used when there is no constraint) |

In an exemplary embodiment, data types of respective elements of the listOfOperatingChNumbers parameter included in the payloads are as shown in Table 129.

TABLE 129

| Parameter | Data type | Description |
|---|---|---|
| ChannelNumber | INTEGER | Operating channel number |
| occupancy | REAL | This parameter is not used when occupancy is not known, and indicates value of occupancy (from 0 to 1) when occupancy is known. |

In an exemplary embodiment, data types of respective elements of the requiredResource parameter included in the payloads are as shown in Table 130.

TABLE 130

| Parameter | Data type | Description |
| --- | --- | --- |
| requiredBandwidth | REAL | Required bandwidth for WSO operation |
| occupancy | REAL | This parameter is not used when expected occupancy is not known, and indicates occupancy (from 0 to 1) when expected occupancy is known. |

A procedure performed between a CM and a CDIS to obtain coexistence set information will be described below.

Coexistence Set Information

Figure 12:
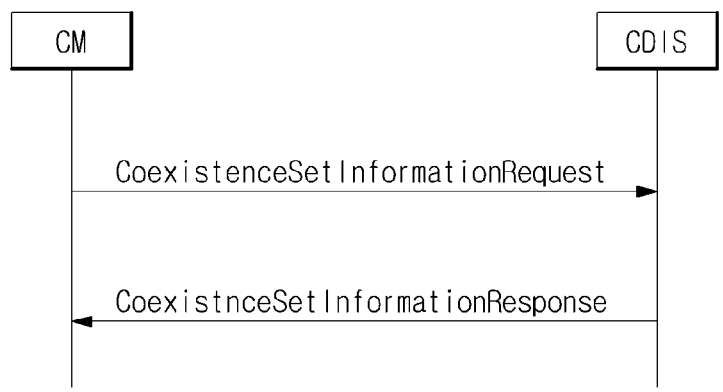
FIG. 12 shows an obtaining coexistence set information procedure according to an exemplary embodiment of the present invention.

FIG. 12 shows an obtaining coexistence set information procedure according to an exemplary embodiment of the present invention.

To obtain coexistence set information from a CDIS, a CM may perform an obtaining coexistence set information procedure. According to the subscription service type of the CM, the CM may obtain only inter-CM coexistence set information, or inter-CM and intra-CM coexistence set information.

First, the CM generates a CoexistenceSetInformationRequest message, sends the CoexistenceSetInformationRequest message to the CDIS, and then waits for a CoexistenceSetInformationResponse message from the CDIS.

In an exemplary embodiment, CxMessage parameters and a payload of the CoexistenceSetInformationRequest message are as shown in Tables 131 and 132 below, respectively.

TABLE 131

| Parameter | Data type | Value |
| --- | --- | --- |
| header | CxHeader | requestID |
| payload | CxPayload | coexistenceSetInformationRequest |

TABLE 132

| Parameter | Data type | Description |
| --- | --- | --- |
| listOfNetworkID | SEQUENCE OF OCTET STRING | List of network IDs of WSO requiring coexistence set information |

When the CoexistenceSetInformationRequest message is received, the CDIS obtains coexistence set information and sends a CoexistenceSetInformationResponse message to the CM.

In an exemplary embodiment, CxMessage parameters and payloads of the CoexistenceSetInformationResponse message are as shown in Tables 133 and 134 below, respectively.

TABLE 133

| Parameter | Data type | Value |
| --- | --- | --- |
| header | CxHeader | requestID |
| payload | CxPayload | coexistenceSetInformationResponse |

TABLE 134

| Parameter | Data type | Description |
| --- | --- | --- |
| networkID | OCTET STRING | Network ID of WSO requiring coexistence set information |
| listOfneighborCM | ListOfNeighborCM | List of neighbor CMs |

In an exemplary embodiment, data types of respective elements of the listOfneighborCM parameter included in the payloads are as shown in Table 135.

TABLE 135

| Parameter | Data type | Description |
| --- | --- | --- |
| neighborCMID | CxID | Neighbor CM ID |
| listOfCoexSetElement | ListOfCoexSetElement | List of neighbor WSOs |

In an exemplary embodiment, the data type of each element of the listOfCoexSetElement parameter included in the payloads is as shown in Table 136.

TABLE 136

| Parameter | Data type | Description |
| --- | --- | --- |
| networkID | OCTET STRING | Neighbor network ID |
| networkTechnology | NetworkTechnology | Neighbor WSO network technology |

Figure 13:
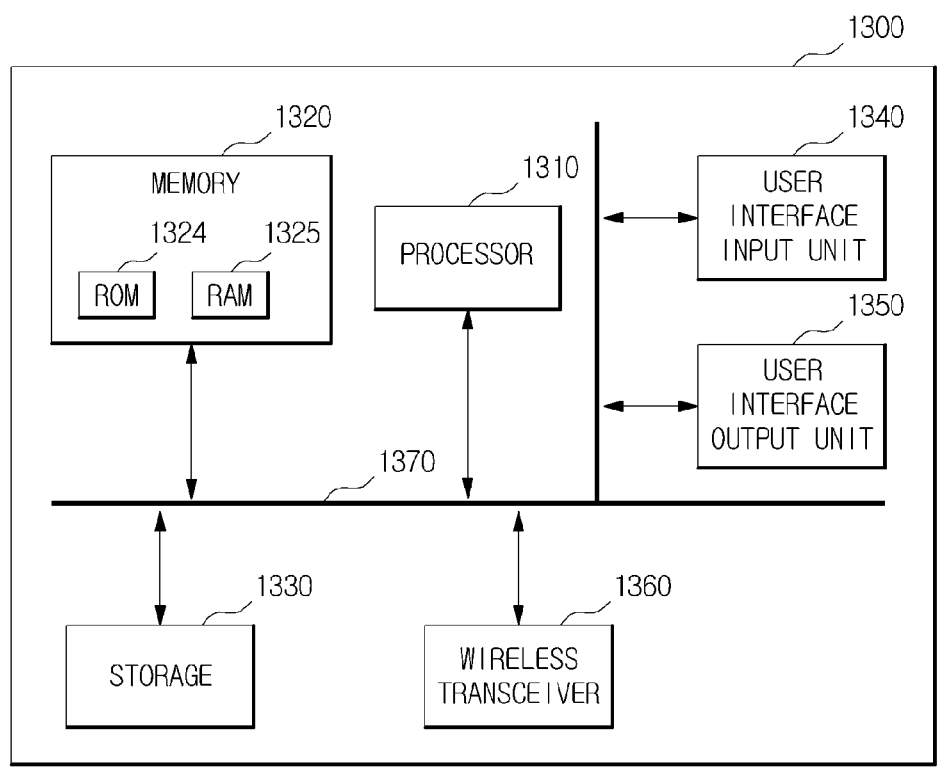
FIG. 13 is a block diagram showing a structure of a CM according to an exemplary embodiment of the present invention.

FIG. 13 is a block diagram showing a structure of a CM according to an exemplary embodiment of the present invention.

As shown in the drawing, like a general-purpose computer system, a CM may include at least one element among at least one processor 1310, a memory 1320, a storage 1330, a user interface input unit 1340, a user interface output unit 1350, and a wireless transceiver 1360, and these may communicate with each other via a bus 1370.

The processor 1310 may be a central processing unit (CPU) or a semiconductor device that executes instructions stored in the memory 1320 and/or the storage 1330. The memory 1320 and the storage 1330 may include various types of volatile/non-volatile storage media. For example, the memory 1320 may include a read only memory (ROM) 1324 and a random access memory (RAM) 1325.

The methods of exchanging messages among entities in a coexistence management system according to the above-described exemplary embodiments of the present invention may be implemented in the form of computer-executable instructions and recorded in the memory 1320 and/or the storage 1330. When the instructions are executed by the processor 1310, a message exchanging method according to at least one exemplary embodiment of the present invention may be performed.

In an exemplary embodiment, a message defined according to Abstract Syntax Notation One (ASN.1) is as shown below.

IEEE802191Message DEFINITIONS AUTOMATIC TAGS ::= BEGIN

-----------------------------------------------------------

--Imported data types

-----------------------------------------------------------

--Imported data types

IMPORTS

--Coexistence report

CoexistenceReport,

--Channel priority

ChannelPriority,

--Network technology

NetworkTechnology,

--Network type

NetworkType,

--Discovery information

DiscoveryInformation,

--List of available channel numbers

ListOfAvailableChNumbers,

--List of operating channel numbers

ListOfOperatingChNumbers,

--Required resource

RequiredResource,

--Measurement capability

MeasurementCapability,

--List of neighbor CM

ListOfNeighborCM

-- Operation code

OperationCode,

--Transmission schedule

TxSchedule,

--Failed parameters

FailedParameters,

--Subscribed service

SubscribedService,

--Status

CxMediaStatus,

--Coexistence protocol entity ID

CxID,

--Channel classification information

ChClassInfo,

--Required information description

ReqInfoDescr,

- Requested information value

ReqInfoValue,

--Event parameters

EventParams,

-- Negotiation status

NegotiationStatus,

-- Negotiation information

NegotiationInformation

-- Winner CM ID list

ListOfWinnerCMID,

-- Slot time position list

ListOfSlotTimePosition

--Measurement description

MeasurementDescription,

--Measurement result

MeasurementResult

FROM IEEE802191DataType;

----------------------------------------------------------

--Message structure, header structure, and payload types

----------------------------------------------------------

--Message structure

CxMessage ::= SEQUENCE {

-- Message header header CxHeader,

-- Message payload payload CxPayload

}

--Header

```
CxHeader ::= CHOICE {
    --For announcement
    none NULL,
    --For request or single response
    requestID INTEGER (0..2147483647),
    --For multiple responses
    multipleResponse SEQUENCE {
        --Original request ID
        requestID INTEGER (0..2147483647),
        --Response number
        sequenceNumber INTEGER (0..2147483647),
        --True is the response is last
        isLastResponse BOOLEAN}
}

--Payload types
CxPayload ::= CHOICE {
--WSO subscription request
    subscriptionRequest      SubscriptionRequest,
--WSO subscription response
    subscriptionResponse     SubscriptionResponse,
--WSO subscription change request
    subscriptionChangeRequest      SubscriptionChangeRequest,
--WSO subscription change response
    subscriptionChangeResponse     SubscriptionChangeResponse,
--CE registration request
    ceRegistrationRequest    CERegistrationRequest,
--Registration response
    registrationResponse     RegistrationResponse,
--CM registration request
    cmRegistrationRequest    CMRegistrationRequest,
--Coexistence set information request
coexistenceSetInformationRequest       CoexistenceSetInformationRequest,
```

```
--Coexistence set information response
    coexistenceSetInformationResponse
CoexistenceSetInformationResponse,
--Coexistence report request
    coexistenceReportRequest      CoexistenceReportRequest,
--Coexistence report response
    coexistenceReportResponse     CoexistenceReportResponse,
--Reconfiguration request
    reconfigurationRequest        ReconfigurationRequest,
--Reconfiguration response
    reconfigurationResponse       ReconfigurationResponse,
--CM Reconfiguration request
    cmReconfigurationRequest      CMReconfigurationRequest,
--CM Reconfiguration response
    cmReconfigurationResponse     CMReconfigurationResponse,
--WSO channel classification request
channelClassificationRequest      ChannelClassificationRequest,
-- WSO channel classification response
    channelClassificationResponse  ChannelClassificationResponse,
--CM channel classification request
cmChannelClassificationRequest    CMChannelClassificationRequest,
-- CM channel classification response
    cmChannelClassificationResponse
CMChannelClassificationResponse,
-- WSO channel classification update
channelClassificationAnnouncement
ChannelClassificationAnnouncement,
    --Available channel list request from WSO
    availableChannelsRequest      AvailableChannelsRequest,
    -- Available channel list response from WSO
    availableChannelsResponse     AvailableChannelsResponse,
    --Information acquiring request
    infoAcquiringRequest          InforAcquiringRequest,
```

```
        --Information acquiring response
        infoAcquiringResponse        InforAcquiringResponse,
        -- Event indication
        eventIndication        EventIndication,
        -- Event confirm
        eventConfirm        EventConfirm,
        --WSO measurement request
        measurementRequest        MeasurementRequest,
        --WSO measurement response
        measurementResponse        MeasurementResponse,
        --WSO measurement confirm
        measurementConfirm        MeasurementConfirm,
        --Master/Slave CM request
        masterCMRequest        MasterCMRequest,
        --Master/Slave CM response
        masterCMResponse        MasterCMResponse,
        --Master/Slave CM configuration request
        masterSlaveCMconfigurationRequest
MasterSlaveCMconfigurationRequest,
        --Master/Slave CM configuration response
        masterSlaveCMconfigurationResponse
MasterSlaveCMconfigurationResponse,
        --Negotiation request
        negotiationRequest        NegotiationRequest,
        --Negotiation announcement
        negotiationAnnouncement        NegotiationAnnouncement,
        --Deregistration request
        wsoDeregistrationRequest        WsoDeregistrationRequest,
        -- Deregistration response
        wsoDeregistrationResponse        WsoDeregistrationResponse,

}
```

---

--WSO & CM subscription & update

---

--Subscription request

SubscriptionRequest ::= SEQUENCE {

--Coexistence service to which WSO is subscribed subscribedService    SubscribedService

}

-- Subscription response

SubscriptionResponse ::= SEQUENCE {

--Status status    CxMediaStatus

}

---

--WSO subscription change

---

--Request to change subscription

SubscriptionChangeRequest ::= SEQUENCE {

--Coexistence service to which WSO is subscribed subscribedService    SubscribedService

}

--Response for subscription change

SubscriptionChangeResponse :: = SEQUENCE {

--Status status    CxMediaStatus

}

---

--WSO registration & update

----------------------------------------------------------

--CE registration request

CERegistrationRequest ::= SEQUENCE {

--Operation code operationCode     OperationCode,

--Network ID networkID     OCTET STRING,

--Network technology networkTechnology     NetworkTechnology,

--Network type networkType    NetworkType

--Discovery information discoveryInformation    DiscoveryInformation,

--Transmission schedule is supported or not txScheduleSupported     BOOLEAN,

--List of available channel numbers listOfAvailableChNumbers     ListOfAvailableChNumbers, --List of supported channel numbers listOfSupportedChNumbers     SEQUENCE OF INTEGER, --List of operating channel numbers listOfOperatingChNumbers     ListOfOperatingChNumbers, --Required resource requiredResource    RequiredResource --Measurement capability measurementCapability     MeasurementCapability

}

--CM registration request

CMRegistrationRequest ::= SEQUENCE {

--Operation code operationCode    OperationCode,

--CE ID

```
ceID        CxID,
--Network ID
    networkID        OCTET STRING,
--Network technology
    networkTechnology    NetworkTechnology,
--Network type
    networkType    NetworkType
--Discovery information
    discoveryInformation    DiscoveryInformation,
--List of supported channel numbers
listOfSupportedChNumbers    SEQUENCE OF INTEGER,
}

-- Registration response
RegistrationResponse :: = SEQUENCE { }
```

---

--Coexistence set information

---

```
--Request for coexistence set information
CoexistenceSetInformationRequest ::= SEQUENCE {
listOfNetworkID    SEQUENCE OF OCTET STRING
}
--Response for coexistence set information
CoexistenceSetInformationResponse ::= SEQUENCE {
--Network ID
coexistenceReport    CoexistenceReport,
--List of neighbor CM
  listOfneighborCM    ListOfneighborCM
}
```

---

--Coexistence report

---

--Request for coexistence report

CoexistenceReportRequest ::= SEQUENCE { }

--Response for coexistence report

CoexistenceReportResponse ::= SEQUENCE {

--Coexistence report information coexistenceReport        CoexistenceReport,

--Channel priority information channelPriority        ChannelPriority

}

---

--WSO reconfiguration

---

--Reconfiguration request

ReconfigurationRequest ::= SEQUENCE {

--List of operating channel numbers listOfOperatingChNumbers       SEQUENCE OF INTEGER, --Transmission power limitation txPowerLimit    REAL, --Indication whether the channel is shared channelIsShared     BOOLEAN, --Transmission schedule txSchedule     TxSchedule , -- Channel classification information chClassInfo     ChClassInfo

}

--Reconfiguration response

ReconfigurationResponse ::= SEQUENCE {

--Status status    BOOLEAN
--Failed parameters
  failedParameters    FailedParameters
}

---

--WSO reconfiguration for another CM

---

--Reconfiguration request
CMReconfigurationRequest ::= SEQUENCE {
--Indication for CE to be reconfigured
reconfigTarget    CxID,
  --List of operating channel numbers
listOfOperatingChNumbers    SEQUENCE OF INTEGER,
  --Transmission power limitation
txPowerLimit    REAL,
--Indication whether the channel is shared
      channelIsShared    BOOLEAN,
      --Transmission schedule
      txSchedule    TxSchedule ,
-- Channel classification information
chClassInfo    ChClassInfo
}

--Reconfiguration response
ReconfigurationResponse ::= SEQUENCE {
--Indication for CE to be reconfigured
reconfigTarget    CxID,
  --Status
status    BOOLEAN
--Failed parameters
  failedParameters    FailedParameters

}

---
--Channel classification
---

--Channel classification request

ChannelClassificationRequest ::= SEQUENCE {

-- List of network ID listOfNetworkID      SEQUENCE OF OCTET STRING

}

-- Channel classification response

ChannelClassificationResponse ::= SEQUENCE   OF SEQUENCE{

-- Network ID networkID      OCTET STRING

--Channel classification information chClassInfo      ChClassInfo

}

--CM Channel classification request

CMChannelClassificationRequest ::= SEQUENCE {

-- List of network ID listOfNetworkID      SEQUENCE OF OCTET STRING

}

-- CM Channel classification response

CMChannelClassificationResponse ::= SEQUENCE   OF SEQUENCE{

-- Network ID networkID      OCTET STRING

--Channel classification information chClassInfo      ChClassInfo

}

---
--Channel classification update
---

--Channel classification update
ChannelClassificationAnnouncement ::= SEQUENCE OF SEQUENCE {
-- Network ID
networkID      OCTET STRING
--Channel classification information
 chClassInfo      ChClassInfo
}

---
--Information acquiring from another CM
---

-- Information acquiring request
InfoAcquiringRequest ::= SEQUENCE {
ceID              CxID,
listOfReqInfoDescr    SEQUENCE OF ReqInfoDescr
}

-- Information acquiring response
InfoAcquiringResponse ::= SEQUENCE {
ccID           CxID,
reqInfoValue       ReqInfoValue
}

---
--Available channel list from WSO
---

-- Available channel request
AvailableChannelsRequest ::= SEQUENCE { }

-- Available channel response
AvailableChannelsResponse ::= SEQUENCE {
    --Available channel list information
 listOfAvailableChNumbers       ListOfAvailableChNumbers
}

---

--Event indication

---

-- Event indication
EventIndication ::= SEQUENCE {
-- Event indication information
eventParams    EventParams
}

-- Event confirm
EventConfirm ::= SEQUENCE { }

---

--Measurement Request

---

-- Measurement request
MeasurementRequest ::= SEQUENCE {
-- Measurement request information
measurementDescription       MeasurementDescription
}

-- Measurement results

-- Measurement response
MeasurementResponse ::= SEQUENCE OF SEQUENCE{
-- Measurement results
measurementResult        MeasurementResult
}

-- Negotiation

-- Negotiation request
NegotiationRequest ::= SEQUENCE {
    -- Negotiation status
    negotiationStatus            NegotiationStatus,
    -- Negotiation information
    negotiationInformation       NegotiationInformation
}
-- Negotiation announcement
NegotiationAnnouncement ::= SEQUENCE {
    -- Winner CM ID list
    listOfWinnerCMID             ListOfWinnerCMID,
    -- Slot time position list
    listOfSlotTimePosition       ListOfSlotTimePosition
}

--Master/Slave CM selection

--Master/Slave CM selection request

```
MasterCMRequest ::= SEQUENCE {
    --List of CEs managed by CM that intends to become slave CM
listOfCEs     SEQUENCE OF CxID,
}

-- Master/Slave CM selection response
MasterCMResponse ::= SEQUENCE {
    --Status
status CxMediaStatus
}
```

---------------------------------------------------------

--Master/Slave CM configuration

---------------------------------------------------------

```
--Master/Slave CM configuration request
MasterSlaveCMconfigurationRequest ::= SEQUENCE {
    -- List of CEs managed by CM
listOfCEs     SEQUENCE OF CxID,
}

--Master/Slave CM configuration response
MasterSlaveCMconfigurationResponse ::= SEQUENCE {
--Operation code
operationCode     OperationCode,
--Slave CE ID
slaveCeID     CxID,
--Network ID
    networkID     OCTET STRING,
    --Network technology
    networkTechnology     NetworkTechnology,
    --Network type
    networkType     NetworkType
```

```
            --Discovery information
        discoveryInformation    DiscoveryInformation,
        --Transmission schedule is supported or not
        txScheduleSupported    BOOLEAN,
    --List of available channel numbers
    listOfAvailableChNumbers    ListOfAvailableChNumbers,
    --List of supported channel numbers
    listOfSupportedChNumbers    SEQUENCE OF INTEGER,
    --List of operating channel numbers
    listOfOperatingChNumbers    ListOfOperatingChNumbers,
        --Required resource
        requiredResource    RequiredResource
    --Measurement capability
    measurementCapability    MeasurementCapability
}

-----------------------------------------------------------
--WSO deregistration
-----------------------------------------------------------

--Deregistration request
WsoDeregistrationRequest ::= SEQUENCE {
        --Flag of wso deregistration
    wsoDeregistration    BOOLEAN,
}

--Deregistration response
WsoDeregistrationResponse ::= SEQUENCE {
        --Status
    status CxMediaStatus
}

END
```

IEEE80219MEDIASAPPrimitive DEFINITIONS AUTOMATIC TAGS::= BEGIN

---------------------------------------------------------
--Imported data types
---------------------------------------------------------

--Imported data types
IMPORTS
--Coexistence report
    CoexistenceReport,
--Channel priority
    ChannelPriority,
    --Network technology
    NetworkTechnology,
--Network type
    NetworkType,
    --Discovery information
    DiscoveryInformation,
--List of available channel numbers
    ListOfAvailableChNumbers,
--List of operating channel numbers
    ListOfOperatingChNumbers,
    --Required resource
    RequiredResource,
--Measurement capability
    MeasurementCapability,
    -- Operation code
    OperationCode, --Transmission schedule TxSchedule, --Failed parameters FailedParameters, --Subscribed service SubscribedService, --Status CxMediaStatus, --Coexistence protocol entity ID CxID, --Channel classification information list ChClassInfoList, --Event parameters EventParams, --Measurement description MeasurementDescription, --Measurement result MeasurementResult, FROM IEEE802191DataType;

------------------------------------------------------

--WSO subscription

------------------------------------------------------

--Request for subscription information

GetServiceSubscriptionRequest ::= SEQUENCE { }

--Subscription information

GetServiceSubscriptionResponse ::= SEQUENCE {

--Coexistence service to which WSO is subscribed subscribedService    SubscribedService, --Status

```
status    CxMediaStatus
}

--Confirm for subscription
GetServiceSubscriptionConfirm :: = SEQUENCE {
--Status
status    CxMediaStatus
}
```

---

--WSO subscription update

---

```
--Request to update subscription
NewServiceSubscriptionIndication ::= SEQUENCE {
    --Coexistence service to which WSO is subscribed
    subscribedService    SubscribedService
}

--Confirm for subscription update
GetServiceSubscriptionConfirm :: = SEQUENCE {
--Status
status    CxMediaStatus
}
```

---

--WSO subscription change

---

```
--Request to change subscription
ChangeSubscriptionRequest ::= SEQUENCE {
    --Coexistence service to which WSO is subscribed
    subscribedService    SubscribedService
```

}

--Response for subscription change
ChangeSubscriptionResponse :: = SEQUENCE {
--Status
status    CxMediaStatus
}

---------------------------------------------------------

--WSO registration

---------------------------------------------------------

--Request for registration information
GetRegInfoRequest ::= SEQUENCE { }

--Registration information
GetRegInfoResponse ::= SEQUENCE {
--Network ID
    networkID      OCTET STRING,
    --Network technology
    networkTechnology     NetworkTechnology,
    --Network type
    networkType    NetworkType
    --Discovery information
    discoveryInformation     DiscoveryInformation,
    --Transmission schedule is supported or not
    txScheduleSupported     BOOLEAN,
--List of available channel numbers
listOfAvailableChNumbers     ListOfAvailableChNumbers,
--List of supported channel numbers
listOfSupportedChNumbers     SEQUENCE OF INTEGER,
--List of operating channel numbers
listOfOperatingChNumbers     ListOfOperatingChNumbers,

```
        --Required resource
        requiredResource    RequiredResource
--Measurement capability
measurementCapability      MeasurementCapability
}

--Confirm for registration
GetRegInfoConfirm ::= SEQUENCE {
--Status
status    CxMediaStatus
}
```

---

--WSO registration update

---

```
--Updated registration information
NewRegInfoIndication ::= SEQUENCE {
--Network ID
        networkID    OCTET STRING,
        --Network technology
        networkTechnology    NetworkTechnology,
        --Network type
        networkType    NetworkType
        --Discovery information
        discoveryInformation    DiscoveryInformation,
        --Transmission schedule is supported or not
        txScheduleSupported    BOOLEAN,
--List of available channel numbers
listOfAvailableChNumbers    ListOfAvailableChNumbers,
--List of supported channel numbers
listOfSupportedChNumbers    SEQUENCE OF INTEGER,
--List of operating channel numbers
```

```
    listOfOperatingChNumbers    ListOfOperatingChNumbers,
        --Required resource
        requiredResource    RequiredResource
--Measurement capability
measurementCapability    MeasurementCapability
}

--Confirm for registration
NewRegInfoConfirm :: = SEQUENCE {
--Status
status    CxMediaStatus
}
```

---

--Coexistence report for information service

---

```
--Request for coexistence report
CoexistenceReportRequest ::= SEQUENCE { }

--Response for coexistence report
CoexistenceReportResponse ::= SEQUENCE {
--Coexistence report information
coexistenceReport    CoexistenceReport,
    --Channel priority information
  channelPriority    ChannelPriority
}
```

---

--WSO reconfiguration for management service

---

```
--Reconfiguration request
PerformReconfigurationRequest ::= SEQUENCE {
```

```
        --List of operating channel numbers
listOfOperatingChNumber     SEQUENCE OF INTEGER,
        --Transmission power limitation
txPowerLimit    REAL,
--Indication whether the channel is shared
        channelIsShared    BOOLEAN,
        --Transmission schedule
        txSchedule     TxSchedule ,
-- Channel classification information
chClassInfo    ChClassInfo
}

--Reconfiguration response
PerformReconfigurationResponse ::= SEQUENCE {
        --Status
status    BOOLEAN
--Failed parameters
  failedParameters    FailedParameters
}
```

---
--Channel classification requested by CE
---

```
--Channel classification request
ChannelClassificationRequest ::= SEQUENCE {
-- List of network ID
listOfNetworkID    SEQUENCE OF OCTET STRING
}

-- Channel classification response
ChannelClassificationResponse ::= SEQUENCE {
        --List of channel classification information
```

```
    chClassInfoList    ChClassInfoList
}
```

---
--Channel classification update
---

```
--Channel classification update
ChannelClassificationIndication ::= SEQUENCE {
--List of channel classification information
    chClassInfoList    ChClassInfoList
}
```

---
--Available channel list from WSO
---

```
-- Available channel List request
AvailableChannelListRequest ::= SEQUENCE { }

-- Available channel list response
AvailableChannelListResponse ::= SEQUENCE {
    --Available channel list information
    listOfAvailableChNumbers    ListOfAvailableChNumbers
}
```

---
--Event indication
---

```
-- Event indication
EventIndication ::= SEQUENCE {
-- Event indication information
``` eventParams    EventParams
}

---

--Measurement Request

---

-- Measurement request
GetMeasurementRequest ::= SEQUENCE {
-- Measurement request information
measurementDescription MeasurementDescription
}

---

-- Measurement results

---

-- Measurement response
GetMeasurementResponse ::= SEQUENCE OF SEQUENCE{
-- Measurement results
measurementResult    MeasurementResult
}

---

-- WSO Deregistration

---

--Deregistration request
PerformDeregistrationRequest ::= SEQUENCE {
    --List of operating channel numbers
wsoDeregistration  BOOLEAN,
}

-- Deregistration response

PerformReconfigurationResponse ::= SEQUENCE {

--Status status    BOOLEAN

}

END

IEEE802191DataType DEFINITIONS AUTOMATIC TAGS ::= BEGIN

---------------------------------------------------------

--Exported data types

---------------------------------------------------------

--Exported data types

EXPORTS

--Coexistence report

CoexistenceReport,

--Channel priority

ChannelPriority,

--Network technology

NetworkTechnology,

--Network type

NetworkType,

--Discovery information

DiscoveryInformation,

--List of available channel numbers

ListOfAvailableChNumbers,

--List of operating channel numbers

ListOfOperatingChNumbers,

--Required resource

RequiredResource,

--Measurement capability

MeasurementCapability,

--List of neighbor CM

ListOfNeighborCM

-- Operation code

OperationCode,

--Transmission schedule

TxSchedule,

--Failed parameters

FailedParameters,

--Subscribed service

SubscribedService,

--Status

CxMediaStatus,

--Coexistence protocol entity ID

CxID,

--Channel classification information

ChClassInfo,

--Channel classification information list

ChClassInfoList,

--Required information description

ReqInfoDescr,

-- Requested information value

ReqInfoValue,

--Event parameters

EventParams,

-- Negotiation status

NegotiationStatus,

-- Negotiation information

NegotiationInformation

-- Winner CM ID list

ListOfWinnerCMID,

-- Slot time position list

ListOfSlotTimePosition

--Measurement description

MeasurementDescription,

--Measurement result

MeasurementResult;

---------------------------------------------------------

--Coexistence protocol entity ID

---------------------------------------------------------

CxType ::= ENUMERATED { ce, cm, cdis

}

CxID ::= SEQUENCE { type    CxType, id    OCTET STRING}

---------------------------------------------------------

--Status

---------------------------------------------------------

--Status

CxMediaStatus ::= ENUMERATED { noErrorAccepted, noErrorRejected, errorInvalidEntityStatus, errorInvalidArgument, errorProcessFailure, errorNetworkFailure, errorUnknown

}

---

--Subscribed serviced

---

SubscribedService::= ENUMERATED { information, management, interCMCoexistenceSetElementsNeighbors, allCoexistenceSetElementsNeighbors

}

---

--Network technology

---

NetworkTechnology ::= ENUMERATED { ieee802dot11af, ieee802dot22, ecma392, oneSeg

...

}

---

--Network type

---

NetworkType ::= ENUMERATED { fixed, mode1, mode2,

...

}

---
--Discovery information
---

DiscoveryInformation ::= SEQUENCE { coordinateX         REAL, coordinateY         REAL, coordinateZ         REAL, maxTxPower          REAL, rxSensitivity       REAL, antennaGain         REAL, minReqSNR           REAL, antennaHeight       REAL,

...

}

---
--Available channel numbers
---

ConstOfChUseID :: = ENUMERATED { regulationMaxTxPower, regulationMaxAntGain, regulationMaxAntHeight, regulationTVDBUpdateTime, outOfBandEmissionLimit,

...

}

ConstOfChUseValue ::= CHOICE {

```
regulationMaxTxPower      REAL,
regulationMaxAntMaxGain   REAL,
regulationAntMaxHeight    REAL,
regulationTVDBUpdateTime  REAL,
outOfBandEmissionLimit    REAL,
...
}

ConstOfChUses ::= SEQUENCE OF SEQUENCE {
constOfChUseID      ConstOfChUseID,
constOfChUseValue   ConstOfChUseValue
}

ListOfAvailableChNumbers ::= SEQUENCE OF SEQUENCE {
chNumber           INTEGER,
availableStartTime GeneralizedTime,
availableDuration  REAL,
constOfChUses      ConstOfChUses
}
```

---
--Operating channel numbers

---

```
ListOfOperatingChNumbers ::= SEQUENCE OF SEQUENCE {
chNumber   INTEGER,
occupancy  REAL
}
```

---
--Required resource

---

```
RequiredResource ::= SEQUENCE {
    requiredBandwidth    REAL,
    occupancy            REAL
}
```

---
--Measurement capability
---

```
MeasurementCapability ::= ENUMERATED {
    energyDetection,
    featureDetection
    ...
}
```

---
--Operation code
---

```
OperationCode ::= ENUMERATED {
    New,
    Modify,
    Remove
}
```

---
--Coexistence report
---

```
CoexistenceReport ::= SEQUENCE OF SEQUENCE {
    networkID            OCTET STRING,
    networkTechnology    NetworkTechnology,
```

```
listOfOperatingChNumbers    ListOfOperatingChNumbers
}

ChannelPriority ::= SEQUENCE OF SEQUENCE {
    channelNumber           INTEGER,
priority                    INTEGER
}
```

---

--Coexistence set information

---

```
ListOfCoexSetElement ::= SEQUENCE OF SEQUENCE {
    networkID               OCTET STRING,
networkTechnology           NetworkTechnology
}

ListOfNeighborCM ::= SEQUENCE OF SEQUENCE {
    neighborCMID            CxID,
listOfCoexSetElement        ListOfCoexSetElement
}
```

---

--Transmission schedule

---

```
TxSchedule ::= SEQUENCE OF SEQUENCE{
scheduleStartTime           GeneralizedTime,
scheduleDuration            REAL,
numberOfScheduleRepetitions INTEGER,
transmissionStartTime       REAL,
transmissionDuration        REAL
}
```

---

--Channel classification

---

OperatingChannelInfo ::= SEQUENCE { operatingChannelNumber INTEGER, listOfNetworkID SEQUENCE OF OCTET STRING,

...

}

ChClassInfo ::= SEQUENCE { availableChannelList SEQUENCE OF INTEGER, restrictedChannelList SEQUENCE OF INTEGER, protectedChannelList SEQUENCE OF INTEGER, unclassifiedChannelList SEQUENCE OF INTEGER, operatingChannelList SEQUENCE OF OperatingChannelInfo, coexistenceChannelList SEQUENCE OF OperatingChannelInfo,

...

}

ChClassInfoList ::= SEQUENCE OF SEQUENCE { networkID OCTET STRING, chClassInfo ChClassInfo

}

---

--Failed parameters

---

FailedParameterID ::= ENUMERATED { listOfoperatingChNumbers, txPowerLimit, channelIsShared,

```
txSchedule,
}

FailedParameterValue ::= CHOICE {
listOfoperatingChNumbers        SEQUENCE OF INTEGER,
txPowerLimit                    REAL,
channelIsShared                 BOOLEAN,
txSchedule                      TxSchedule
}

FailedParameters ::= SEQUENCE OF SEQUENCE {
failedParameterID       FailedParameterID,
failedParameterValue    FailedParameterValue
}
```

---
--Event indication
---

```
EventDescr ::= ENUMERATED{
sinrThresholdReached,
qosDegradation,
...
}

EventParams ::= SEQUENCE {
eventDescr      EventDescr
}
```

---
--Information Acquiring
---

```
ReqInfoDescr ::= SEQUENCE OF ENUMERATED {
sinr,
desiredBandwidth,
desiredOccupancy,
desiredQoS,
desiredCoverage,
channelNumber,
subscribedService,
interferenceLevel,
fairness,
threshold,
...
}

ReqInfoValue ::= SEQUENCE OF SEQUENCE {
reqInfoDescr        ReqInfoDescr,
reqInfoValue        CHOICE {
sinrValue                   REAL,
desiredBandwidthValue       REAL,
desiredOccupancyValue       REAL,
desiredQoSValue             REAL,
desiredCoverageValue        REAL,
channelNumberValue          REAL,
subscribedServiceValue      SubscribedService
interferenceLevelValue      REAL,
fairnessValue               REAL,
thresholdValue              REAL,
otherValue                  ANY
}
```

---

--Negotiation

---

```
NegotiationStatus :: = SEQUENCE {
    negotiationSuccess      BOOLEAN,
    negotiationFailure      BOOLEAN,
    underNegotiation        BOOLEAN,
    ...
}

StartEndTime :: = SEQUENCE {
    startTime       REAL,
    endTime         REAL
}

TimeSharingUnitInfo ::= SEQUENCE {
    referenceTime       REAL,
    windowTime          StartEndTime,
    slotTime            StartEndTime,
    ...
}

NegotiationInformation :: = SEQUENCE {
    mode                            BOOLEAN,
    listOfChNumber                  SEQUENCE OF INTEGER
    timeSharingUnitInfo             TimeSharingUnitInfo,
    slotTimePosition                StartEndTime,
    numberOfSlots                   INTEGER
    disallowedSlotTimePosition      StartEndTime,
    listOfContentionNumbers         SEQUENCE OF REAL,
    ...
}

ListOfWinnerCMID ::= SEQUENCE OF CxID
```

ListOfSlotTimePosition ::= SEQUENCE OF REAL

---

--Measurement

---

MeasurementSchedule ::= SEQUENCE {
measStartTime          REAL,
numberOfMeasurements   INTEGER,
timeBetweenMeasurements    REAL
}

MeasurementFreq ::= SEQUENCE OF INTEGER

MeasurementType ::= ENUMERATED {
interferenceLevel
}

MeasurementDescription ::= SEQUENCE {
measType           MeasurementType,
measSchedule       MeasurementSchedule,
measFreq           MeasurementFreq
}

MeasurementReport ::= CHOICE {
interferenceLevelValue    REAL,
...
}

MeasurementResult ::= SEQUENCE OF SEQUENCE {
measurementDescription    MeasurementDescription,
measurementReport         MeasurementReport,
}

An apparatus and method according to exemplary embodiments of the present invention may be implemented in the form of program instructions that may be executed by various computer means and may be recorded in a computer-readable medium. The computer-readable medium may include program instructions, a data file, a data structure, etc., solely or in a combined manner.

The program instructions recorded in the computer-readable medium may be specially designed and configured for the present invention, or known and available to those of ordinary skill in the field of computer software. Examples of the computer-readable medium include magnetic media, such as a hard disk, a floppy disk, and a magnetic tape, optical media, such as a CD-ROM and a DVD, magneto-optical media, such as a floptical disk, and hardware devices, such as a ROM, a RAM, and a flash memory, specially configured to store and perform program instructions. The above-described medium may also be a transmission medium, such as light, a metal wire, or a waveguide including carrier waves that send signals for designating program instructions, data structures, and so on. Examples of the program instructions may include high-level language codes executable by a computer using an interpreter, etc., as well as machine language codes made by compilers.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method of exchanging messages between coexistence managers (CMs) in a coexistence management system including coexistence enablers (CEs), the CMs, and a coexistence discovery and information server (CDIS), the method comprising:
  generating, by a first CM to be a slave, a MasterCMRequest message and sending the MasterCMRequest message to at least one second CM to be a master;
  receiving a MasterCMResponse message from the second CM, wherein the first CM having sent the MasterCMRequest message is set as the slave, and the second CM having sent the MasterCMResponse message is set as the master;
  receiving a MasterSlaveCMConfigurationRequest message from the second CM set as the master, wherein the MasterSlaveCMConfigurationRequest message is generated by the second CM set as the master; and
  generating a MasterSlaveCMConfigurationResponse message and sending the MasterSlaveCMConfigurationResponse message to the second CM set as the master.

2. The method of claim 1, wherein the MasterCMRequest message includes a list of CEs managed by the first CM to be the slave.

3. The method of claim 1, wherein the MasterSlaveCMConfiguration Request message includes a list of CEs managed by the second CM set as the master.

4. The method of claim 1, further comprising generating, by the first CM set as the slave, the MasterSlaveCMConfiguration Response message and sending the MasterSlaveCMConfiguration Response message to the second CM set as the master,
  wherein the MasterSlaveCMConfiguration Response message includes at least one of an operation code, a CE identifier (ID), a network ID of a white space object (WSO), network technology information of the WSO, a network type, discovery information of the WSO, a flag indicating whether or not scheduled transmission is supported, an available channel list, a supported channel number list, a WSO operating channel list, resource information required for a WSO operation, and measurement capability information of the WSO, with regard to each of CEs to be registered in the first CM set as the slave and managed by the second CM set as the master.

5. The method of claim 4, wherein the available channel list includes at least one of an available channel number, an available start time of the available channel number, an available duration of the available channel number, and constraint information of the available channel number.

6. The method of claim 4, wherein the required resource information includes at least one of a required bandwidth and an expected occupancy.

7. A method of exchanging messages between coexistence managers (CMs) in a coexistence management system including coexistence enablers (CEs), the CMs, and a coexistence discovery and information server (CDIS), the method comprising:
  receiving, by a second CM to be a master, a MasterCMRequest message from a first CM to be a slave, wherein the MasterCMRequest message is generated by the first CM to be a slave;
  generating a MasterCMResponse message and sending the MasterCMResponse message to first CM to be a slave, wherein the first CM having sent the MasterCMRequest message is set as the slave, and the second CM having sent the MasterCMResponse message is set as the master;
  generating a MasterSlaveCMConfigurationRequest message and sending the MasterSlaveCMConfigurationRequest message to the first CM set as the slave; and
  receiving a MasterSlaveCMConfigurationResponse message from the first CM set as the slave.

* * * * *